United States Patent
Elfstrom et al.

(10) Patent No.: US 9,031,683 B2
(45) Date of Patent: May 12, 2015

(54) SYSTEMS AND METHODS FOR MANAGING MATERIAL STORAGE VESSELS HAVING INFORMATION STORAGE ELEMENTS

(75) Inventors: Scott Elfstrom, Maplewood, MN (US); Kathleen L. Hanson, Savage, MN (US); Steven E. Haumersen, Woodbury, MN (US); Thomas D. Johnson, Star Prairie, WI (US); Clari Nolet, Los Altos, CA (US); William Smeaton, Edina, MN (US)

(73) Assignee: Entegris, Inc., Billerica, MA (US)

( * ) Notice: Subject to any disclaimer, the term of this patent is extended or adjusted under 35 U.S.C. 154(b) by 369 days.

(21) Appl. No.: 12/307,957

(22) PCT Filed: Jul. 10, 2007

(86) PCT No.: PCT/US2007/073107
§ 371 (c)(1),
(2), (4) Date: Apr. 7, 2009

(87) PCT Pub. No.: WO2008/011297
PCT Pub. Date: Jan. 24, 2008

(65) Prior Publication Data
US 2010/0004772 A1  Jan. 7, 2010

Related U.S. Application Data

(60) Provisional application No. 60/819,681, filed on Jul. 10, 2006.

(51) Int. Cl.
*G06F 19/00* (2011.01)
*G06F 17/30* (2006.01)
(Continued)

(52) U.S. Cl.
CPC ............ *G06Q 10/06* (2013.01); *G07C 9/00111* (2013.01)

(58) Field of Classification Search
CPC .......................... G07C 9/00111; G06Q 10/06
USPC ......... 700/103, 105, 108, 109, 121, 112, 113, 700/115, 116, 213, 222, 228; 702/81, 84; 707/E17.044; 414/935, 940
See application file for complete search history.

(56) References Cited

U.S. PATENT DOCUMENTS

| 4,688,026 A | 8/1987 | Scribner et al. |
| 4,951,512 A | 8/1990 | Mazza et al. |

(Continued)

FOREIGN PATENT DOCUMENTS

| EP | 1001265 A2 | 5/2000 |
| JP | 11-73219 A | 3/1999 |

(Continued)

OTHER PUBLICATIONS

Hanson, K. et al., Manuscript subsequently published as "Improving IC process efficiency with critical materials management" for "Proceedings of SPIE", Jul. 31, 2003, pp. 110.

(Continued)

*Primary Examiner* — Charles Kasenge
(74) *Attorney, Agent, or Firm* — Hultquist, PLLC; Steven J. Hultquist; Cathy Gates

(57) ABSTRACT

Material management systems and methods include material storage vessels with information (e.g., electronic information) storage. Information may be communicated from a storage device to a process tool controller and employed to set or adjust a process tool operating parameter. Material information may be determined by remote analysis and subsequently communicated to an electronic information storage device of a vessel containing such material. Location and movement of material storage vessels within a customer facility may be automatically tracked, with further transfer of material-specific information. Product information may be associatively stored with material-specific information utilized in product manufacture.

27 Claims, 7 Drawing Sheets

(51) Int. Cl.
    *G01N 37/00*     (2006.01)
    *G06Q 10/06*     (2012.01)
    *G07C 9/00*     (2006.01)

(56) References Cited

U.S. PATENT DOCUMENTS

| | | | |
|---|---|---|---|
| 5,014,208 A | 5/1991 | Wolfson | |
| 5,070,328 A | 12/1991 | Fockens | |
| 5,102,010 A | 4/1992 | Osgar et al. | |
| 5,223,796 A | 6/1993 | Waldman et al. | |
| 5,351,415 A * | 10/1994 | Brooks et al. | 141/85 |
| 5,385,060 A | 1/1995 | Wang | |
| 5,524,794 A | 6/1996 | Benedetti, Jr. et al. | |
| 5,539,188 A | 7/1996 | Fallah et al. | |
| 5,558,083 A | 9/1996 | Bathe et al. | |
| 5,594,162 A | 1/1997 | Dolan et al. | |
| 5,603,430 A | 2/1997 | Loehrke et al. | |
| 5,604,681 A | 2/1997 | Koeninger | |
| 5,627,517 A | 5/1997 | Theimer et al. | |
| 5,635,652 A | 6/1997 | Beaudin | |
| 5,638,285 A | 6/1997 | Newton | |
| 5,651,402 A | 7/1997 | McCaul | |
| 5,737,221 A | 4/1998 | Newton | |
| 5,744,696 A | 4/1998 | Wang et al. | |
| 5,774,876 A | 6/1998 | Woolley et al. | |
| 5,802,859 A | 9/1998 | Zugibe | |
| 5,803,673 A | 9/1998 | Reinsch et al. | |
| 5,852,590 A | 12/1998 | de la Huerga | |
| 5,875,921 A | 3/1999 | Osgar et al. | |
| 5,883,376 A | 3/1999 | Roesch et al. | |
| 5,893,263 A | 4/1999 | Matsumoto et al. | |
| 5,940,780 A | 8/1999 | Azar et al. | |
| 5,942,980 A | 8/1999 | Hoben et al. | |
| 5,949,049 A | 9/1999 | McCarrick et al. | |
| 5,953,682 A * | 9/1999 | McCarrick et al. | 702/45 |
| 5,955,684 A | 9/1999 | Gravel et al. | |
| 5,980,183 A * | 11/1999 | Fosnight | 414/940 |
| 6,065,638 A | 5/2000 | Terranova et al. | |
| 6,067,844 A | 5/2000 | Westbrook et al. | |
| 6,140,146 A | 10/2000 | Brady et al. | |
| 6,147,662 A | 11/2000 | Grabau et al. | |
| 6,161,706 A | 12/2000 | Mc Cord | |
| 6,165,347 A | 12/2000 | Warburton | |
| 6,206,240 B1 | 3/2001 | Osgar et al. | |
| 6,209,592 B1 | 4/2001 | Gilboa et al. | |
| 6,234,006 B1 | 5/2001 | Sunshine et al. | |
| 6,271,753 B1 | 8/2001 | Shukla | |
| 6,275,746 B1 | 8/2001 | Leatherman et al. | |
| 6,281,787 B1 | 8/2001 | Lerg et al. | |
| 6,282,458 B1 | 8/2001 | Murayama et al. | |
| 6,318,568 B1 | 11/2001 | Mc Cord | |
| 6,347,723 B1 | 2/2002 | Barlian et al. | |
| 6,405,745 B1 | 6/2002 | Kar et al. | |
| 6,446,644 B1 | 9/2002 | Dolechek | |
| 6,469,627 B1 * | 10/2002 | Forster et al. | 340/572.8 |
| 6,494,343 B2 | 12/2002 | McManus et al. | |
| 6,516,249 B1 | 2/2003 | Hoyle et al. | |
| 6,524,774 B1 | 2/2003 | Sonderman | |
| 6,542,848 B1 | 4/2003 | Neeser et al. | |
| 6,545,592 B2 | 4/2003 | Weiner | |
| 6,556,027 B2 | 4/2003 | Banks | |
| 6,556,832 B1 | 4/2003 | Soliman | |
| 6,556,889 B2 | 4/2003 | Rudick et al. | |
| 6,556,949 B1 | 4/2003 | Lyon | |
| 6,558,620 B1 | 5/2003 | Sanford et al. | |
| 6,571,151 B1 | 5/2003 | Leatherman | |
| 6,579,052 B1 * | 6/2003 | Bonora et al. | 414/940 |
| 6,580,357 B1 * | 6/2003 | Forster et al. | 340/10.1 |
| 6,592,043 B1 | 7/2003 | Britton | |
| 6,597,175 B1 | 7/2003 | Brisco | |
| 6,618,714 B1 | 9/2003 | Abrahams | |
| 6,631,829 B1 | 10/2003 | Wagner et al. | |
| 6,633,796 B1 | 10/2003 | Pool et al. | |
| 6,642,897 B2 | 11/2003 | Forster et al. | |
| 6,649,829 B2 | 11/2003 | Garber et al. | |
| 6,672,341 B2 | 1/2004 | Bartholomew et al. | |
| 6,698,619 B2 | 3/2004 | Wertenberger | |
| 6,714,121 B1 * | 3/2004 | Moore | 340/10.3 |
| 6,720,866 B1 | 4/2004 | Sorrells et al. | |
| 6,732,945 B2 | 5/2004 | Dolechek | |
| 6,747,558 B1 | 6/2004 | Thorne et al. | |
| 6,830,181 B1 * | 12/2004 | Bennett | 235/440 |
| 6,843,414 B2 | 1/2005 | Madrid et al. | |
| 6,879,876 B2 * | 4/2005 | O'Dougherty et al. | 700/231 |
| 6,901,971 B2 * | 6/2005 | Speasl et al. | 414/940 |
| 6,942,123 B2 * | 9/2005 | Wertenberger | 222/94 |
| 6,956,538 B2 * | 10/2005 | Moore | 343/878 |
| 6,968,876 B2 * | 11/2005 | Yacko et al. | 141/361 |
| 6,990,391 B1 * | 1/2006 | Cunha et al. | 700/237 |
| 7,032,814 B2 * | 4/2006 | Blankenship | 235/375 |
| 7,042,358 B2 * | 5/2006 | Moore | 340/572.1 |
| 7,053,775 B2 * | 5/2006 | Moore | 340/572.1 |
| 7,061,379 B2 * | 6/2006 | Chen et al. | 700/215 |
| 7,061,831 B2 | 6/2006 | De La Huerga | |
| 7,069,100 B2 * | 6/2006 | Monette et al. | 700/116 |
| 7,150,299 B2 * | 12/2006 | Hertzler et al. | 141/94 |
| 7,156,129 B2 * | 1/2007 | Speasl et al. | 414/940 |
| 7,176,800 B2 | 2/2007 | Sajkowsky | |
| 7,188,644 B2 | 3/2007 | Kelly et al. | |
| 7,224,273 B2 * | 5/2007 | Forster | 340/539.1 |
| 7,284,576 B1 * | 10/2007 | Yacko et al. | 141/95 |
| 7,286,888 B2 * | 10/2007 | Monette et al. | 700/95 |
| 7,316,329 B2 * | 1/2008 | Wertenberger | 222/105 |
| 7,319,912 B2 * | 1/2008 | Park et al. | 700/116 |
| 7,451,935 B2 | 11/2008 | Chang | |
| 7,486,180 B2 * | 2/2009 | Cox et al. | 340/505 |
| 7,490,637 B2 * | 2/2009 | Speasl et al. | 700/228 |
| 7,520,286 B2 * | 4/2009 | Davis et al. | 134/166 R |
| 7,638,001 B2 * | 12/2009 | Kawamura | 118/692 |
| 7,664,568 B2 * | 2/2010 | O'Dougherty et al. | 700/231 |
| 7,702,413 B2 * | 4/2010 | Ushiku et al. | 700/121 |
| 7,702,418 B2 * | 4/2010 | O'Dougherty et al. | 700/231 |
| 7,747,344 B2 * | 6/2010 | O'Dougherty et al. | 700/231 |
| 7,760,104 B2 | 7/2010 | Asp et al. | |
| 7,808,367 B2 * | 10/2010 | Moore | 340/10.3 |
| 2001/0052465 A1 | 12/2001 | Dordi et al. | |
| 2002/0040592 A1 | 4/2002 | Getman et al. | |
| 2002/0078363 A1 | 6/2002 | Hill et al. | |
| 2002/0082746 A1 * | 6/2002 | Schubring et al. | 700/275 |
| 2002/0183883 A1 | 12/2002 | Carr et al. | |
| 2002/0187025 A1 * | 12/2002 | Speasl et al. | 414/909 |
| 2002/0190845 A1 * | 12/2002 | Moore | 340/10.3 |
| 2002/0196145 A1 * | 12/2002 | Moore | 340/572.5 |
| 2002/0196146 A1 * | 12/2002 | Moore | 340/572.7 |
| 2003/0001725 A1 * | 1/2003 | Moore | 340/10.3 |
| 2003/0001726 A1 * | 1/2003 | Moore | 340/10.3 |
| 2003/0004608 A1 * | 1/2003 | O'Dougherty et al. | 700/244 |
| 2003/0077153 A1 * | 4/2003 | Elliott et al. | 414/940 |
| 2003/0205285 A1 | 11/2003 | Kelly et al. | |
| 2003/0205581 A1 | 11/2003 | Wertenberger | |
| 2004/0058453 A1 | 3/2004 | Free et al. | |
| 2004/0246096 A1 | 12/2004 | Queenan | |
| 2004/0246097 A1 | 12/2004 | Queenan | |
| 2005/0095774 A1 * | 5/2005 | Ushiku et al. | 438/222 |
| 2005/0099292 A1 | 5/2005 | Sajkowsky | |
| 2005/0177274 A1 | 8/2005 | O'Dougherty et al. | |
| 2005/0263067 A1 * | 12/2005 | Kawamura | 118/663 |
| 2005/0284535 A1 * | 12/2005 | Speasl et al. | 414/940 |
| 2006/0042651 A1 * | 3/2006 | Verhaverbeke et al. | 134/1 |
| 2006/0174832 A1 | 8/2006 | Nishimura et al. | |
| 2006/0200261 A1 * | 9/2006 | Monette et al. | 700/108 |
| 2006/0255138 A1 | 11/2006 | Chang | |
| 2006/0292845 A1 * | 12/2006 | Chiang et al. | 438/597 |
| 2006/0292846 A1 * | 12/2006 | Pinto et al. | 438/597 |
| 2007/0090953 A1 * | 4/2007 | Park et al. | 340/572.1 |
| 2007/0125404 A1 * | 6/2007 | Davis et al. | 134/33 |

(56) References Cited

U.S. PATENT DOCUMENTS

2007/0274814 A1* 11/2007 Kawasaki et al. .......... 414/217.1
2009/0020176 A1   1/2009 Hasegawa et al.

FOREIGN PATENT DOCUMENTS

| | | |
|---|---|---|
| JP | 2002-181296 A | 6/2002 |
| JP | 2003-139864 A | 5/2003 |
| JP | 2005-514965 A | 5/2005 |
| JP | 2006-218391 A | 8/2006 |
| JP | 3931040 B2 | 3/2007 |
| JP | 2007-204102 A | 8/2007 |
| JP | 2007-254032 A | 10/2007 |
| KR | 10-2005-0112564 A | 12/2005 |
| TW | 200401868 A | 2/2004 |
| WO | 9931713 A2 | 6/1999 |
| WO | 0054724 A2 | 9/2000 |
| WO | 02095675 A1 | 11/2002 |
| WO | 03088314 A2 | 10/2003 |
| WO | 2007088661 A1 | 8/2007 |

OTHER PUBLICATIONS

Hanson, K. et al., "Improving IC process efficiency with critical materials management", "Proceedings of SPIE", Jul. 31, 2003, vol. 5043, No. 172, (Abstract Only).

Lorefice, Bob, et al., "How to Minimize Resist Usage During Spin Coating", "Semiconductor International; found online Sep. 29, 2006 at http://www.reed-electronics.com/semiconductor/article/CA164074?pubdate=6%2F1%2F1998", Jun. 1, 1998.

Phillips Semiconductors, "Controllers for high security, crypto and dual interface smart cards", Mar. 1999, Publisher: Phillips Electronics.

Phillips Semiconductors, "MIFAR System Overview", Feb. 1998, Publisher: Phillips Electronics NV.

* cited by examiner

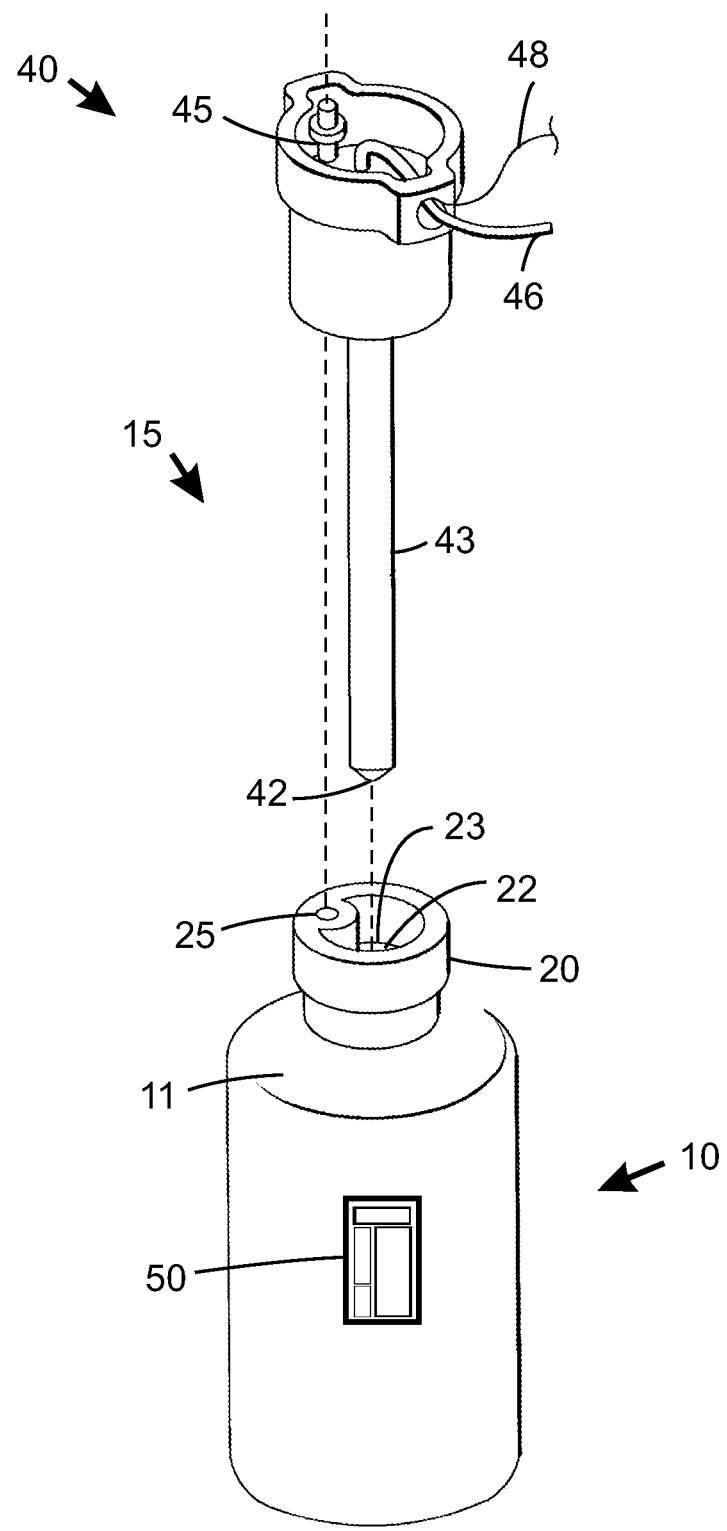
FIG._1

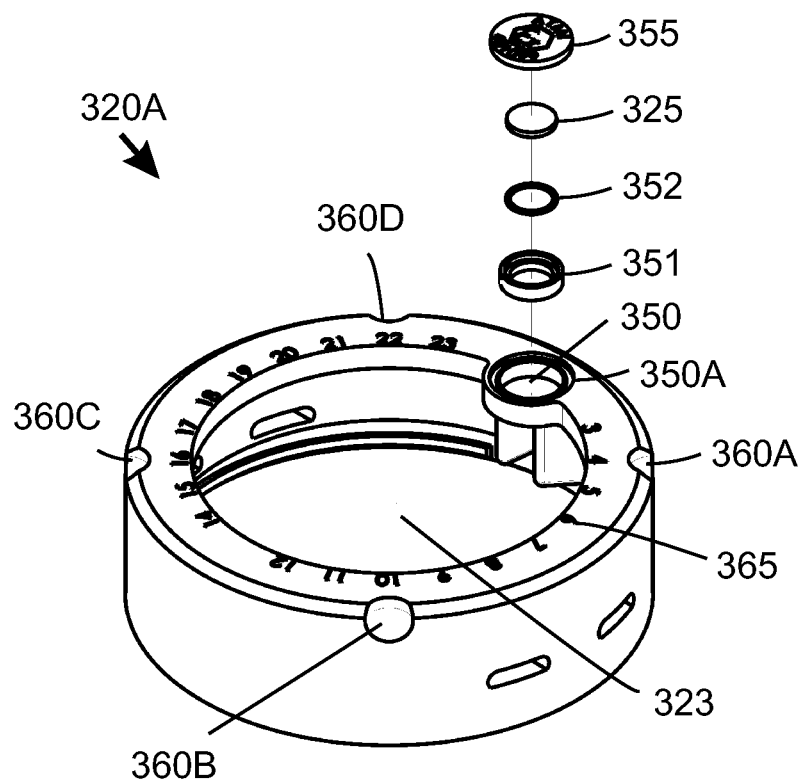
FIG._2A
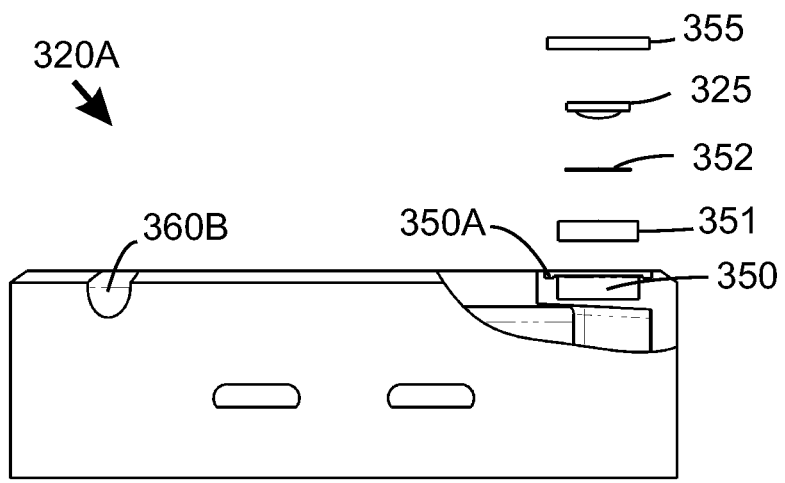
FIG._2B

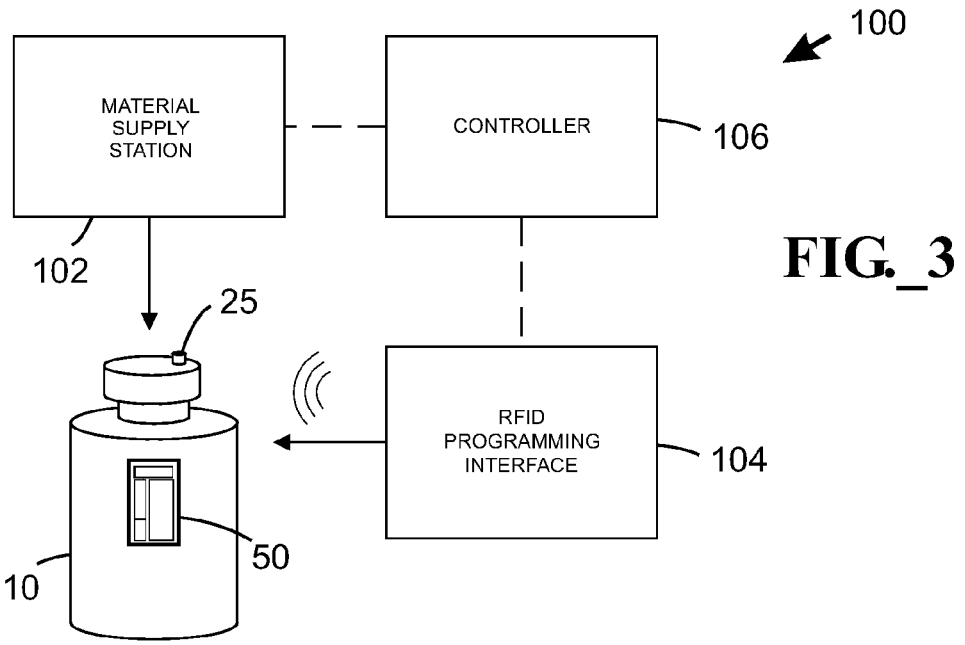
FIG._3
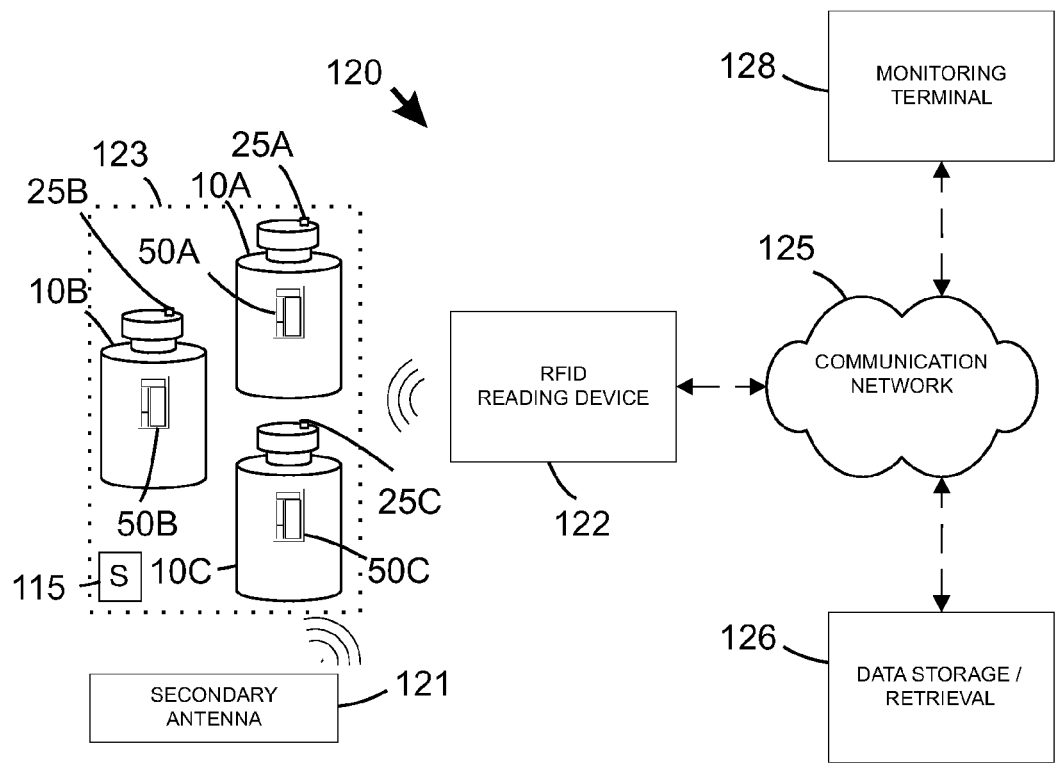
FIG._4

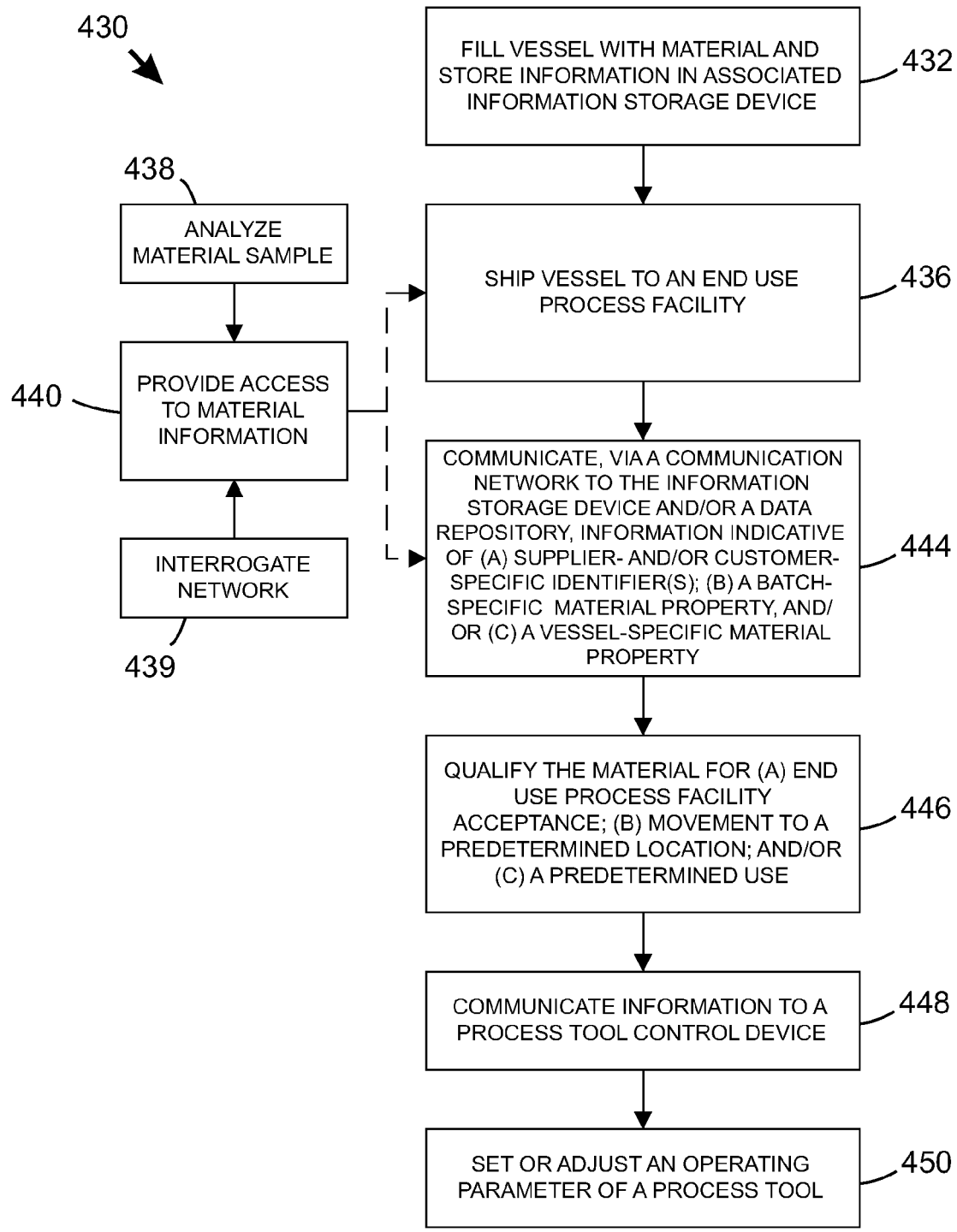
FIG._7

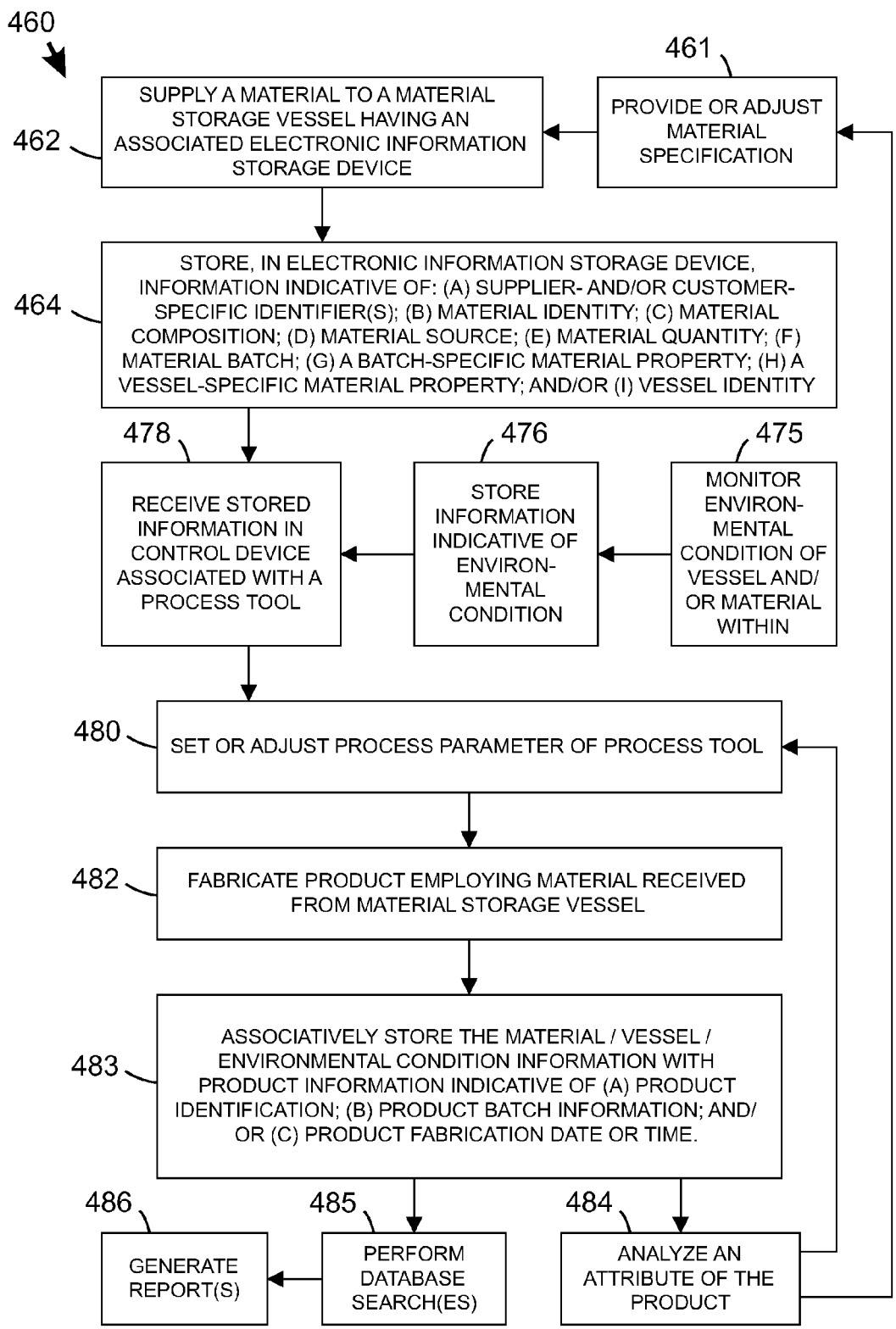
FIG._8

SYSTEMS AND METHODS FOR MANAGING MATERIAL STORAGE VESSELS HAVING INFORMATION STORAGE ELEMENTS

STATEMENT OF RELATED APPLICATION(S)

This application is a U.S. national phase application under the provisions of 35 U.S.C. §371 of International Application No. PCT/US07/73107 filed on Jul. 10, 2007, which in turn claims priority of U.S. Provisional Patent Application No. 60/819,681 filed on Jul. 10, 2006 and entitled "FLUID STORAGE VESSEL MANAGEMENT SYSTEMS AND METHODS EMPLOYING ELECTRONIC INFORMATION STORAGE." The disclosures of such international application and U.S. priority application are hereby incorporated herein by reference in their respective entireties, for all purposes.

FIELD OF THE INVENTION

This invention relates in various aspects to systems and methods employing information storage, particularly electronic information storage (e.g., radio frequency identification) to manage and utilize material storage and dispensing vessels and their contents. Additionally, the invention relates in various aspects to the implementation and use of such systems to set or adjust operating parameters of process tools utilizing materials dispensed from such vessels.

BACKGROUND

Material storage and dispensing vessels are used in a wide variety of industrial processes and commercial and personal applications. Various types of liquids and gases may be placed into vessels such as storage cylinders for transport and ultimately dispensation. One desirable industrial field for application of material storage and dispensing vessels is the fabrication of semiconductor devices.

In the fabrication of semiconductor devices, materials of various types and purposes are deposited on semiconductor substrates typically comprising monocrystalline material such as silicon dioxide. Deposited materials may include copper, aluminum, and other metals to form metal lines or other circuit features within trenches of the semiconductor substrate. Additional circuit features and material layers may be formed on the semiconductor substrate throughout the fabrication process.

In order to form trenches as described above, a photoresist material is first deposited above the semiconductor substrate. The manner of transport and delivery of photoresist material to the semiconductor substrate may be critical to the fabrication process. For example, the cost of applying a wrong type of photoresist may be quite extreme in terms of destroyed high-value semiconductor substrate, wasted high-purity chemicals, and manufacturing process interruption required to correct such an error. Despite this fact, photoresist material supply chains are usually managed with manual systems having intrinsic inefficiencies and a high risk for error, as the typical supply chain involves multiple parties each having independent material tracking platforms incapable of communicating with one another.

The photoresist material described above is typically transported and delivered to the surface of the semiconductor substrate in a liquid form. Spin-on processes are commonly used to apply and spread a thin coating of photoresist across the semiconductor substrate surface. Parameters of the spin-on process are selected to ensure an extremely uniform, thin distribution of the photoresist across the surface of the semiconductor substrate. The material application step is typically followed by a step of heating the semiconductor substrate to solidify the photoresist layer.

The solid photoresist layer described above may be patterned to allow for the formation of trenches therebelow by conventional etching techniques. However, proper trench formation and uniformity thereof is dependent in part upon the uniformity of the thin photoresist layer defining the trenches. Indeed, proper transport and delivery of photoresist material to the semiconductor substrate is critical to the fabrication of a reliable semiconductor device. In fact, as device features such as metal lines become smaller and smaller with advanced semiconductor wafer designs and processing technologies, the adverse effects of photoresist non-uniformity on a device feature are magnified.

Achieving a uniformly thin photoresist layer may require application of a spin-on or other process that employs parameters based on the particular physical and functional characteristics of the photoresist material. Unfortunately, characteristics of a photoresist material type may vary from one batch to the next, or as a result of environmental or time factors inherent in the transport and storage of these materials from the point of origin to the point of use. For example, photoresist viscosity may vary from one batch or vessel to the next, and photoresist properties can be degraded with environmental conditions (e.g., high temperature) and/or age. In view of the variation between different batches and/or vessels or photoresist, it may be extremely difficult to establish predetermined fixed parameters for forming an adequately uniform photoresist layer on a semiconductor substrate. Thus, proper transport and application of photoresist material to the semiconductor substrate includes challenges relating not only to providing the proper type of photoresist material, but also to employing application parameters appropriate to the precise characteristics of the specific photoresist material provided. Sampling and individualized testing of the contents of each vessel immediately prior to end use is impractical in production facilities, and particularly in high-cost production lines intended for high-throughput operation. Moreover, owing to the limited shelf life of photoresist, limited storage capabilities, and the time typically required to perform material analyses, it can be inefficient for a material (e.g., chemical) supplier to store whole batches of materials prior to customer shipment while waiting for results of material analyses.

While challenges associated with the use of photoresist materials have been described hereinabove, similar or analogous difficulties exist in connection with many classes of materials used in semiconductor fabrication and in various other industrial processes. Accordingly, the present invention is not limited in application to photoresist or semiconductor materials. Limitations associated with handling materials of various types include the relative difficulty of managing a large number of vessels having different contents. For example, in a manufacturing process utilizing various chemical reagents or precursor materials stored in vessels of similar types, it may be difficult to perform any of the following tasks: ensure that process parameters appropriate to the specific material disposed in a specific vessel are used in every instance; prevent supply chain interruption; prevent overstock of materials; utilize materials received first-in-time while avoiding the use of degraded or unduly old ('expired') materials; track material-containing vessels already released to customers for potential safety or quality recalls; comply with regulatory storage and/or discharge limits, and comply with regulatory discharge limits. Tracking of vessel movement not only into a material ingress (receiving) area, but also among various functional areas in a material end use process facility would be particularly desirable to aid in identifying and retrieving materials determined to have emanated from contaminated production lots or batches, and/or to aid in supply chain management. It would be desirable to provide systems and methods to address these and other concerns. Traditional material management tools (e.g., bar code systems) are not well-suited to addressing such concerns since they lack dynamic update capability, require line-of-sight scanning, rely on other manual actions, and are usually limited to providing vessel identification information.

To improve the functions of material handling and utilization, enhance process performance and analysis, and reduce material storage vessel misconnect errors, it would be desirable to automate the supply of information from a material storage vessel to a material-consuming process tool. Such automation would preferably address not only communication hardware and related interfaces, but also communication modes and protocols, and data formats and specific data content.

In sensitive and chemical-intensive processes such as semiconductor manufacture, it would be desirable to correlate a fabricated product with information about materials used in its manufacture. Such correlation would be highly useful for process optimization and ongoing quality assurance and quality control. For example, product defects or performance problems attributable to particular source materials—whether or not within material specifications—may not be detected until the fabricated products are rigorously tested. The ability to correlate device performance to source materials would facilitate process optimization and improvement of material specifications without necessarily requiring universal quality assurance testing of all products. To date, however, such benefits have not been realized because product information has not been uniformly and reliably correlated to information regarding materials used in product manufacture.

The foregoing background discussion demonstrates the need for improved material management systems and methods.

SUMMARY OF THE INVENTION

The present invention relates in various aspects to systems and methods employing information storage, e.g., electronic information storage, to manage and utilize material storage/dispensing vessels and their contents.

In a first separate aspect, the present invention relates to a method including the steps of: communicating, from an information storage device associated with a material-containing material storage vessel to a control device associated with a process tool, information indicative of any of a supplier-specific utilization parameter and a process tool operating instruction; and employing the communicated information to set or adjust an operating parameter of the process tool.

In a second separate aspect, the present invention relates to a method including the steps of receiving, from an information storage device associated with a material storage vessel, information indicative of any of a material-specific utilization parameter and a process tool operating instruction; and employing the received information to set or adjust an operating parameter of a process tool.

In a third separate aspect, the present invention relates to a method including, during or after shipment of a material-containing material storage vessel having an associated information storage device to a material end use process facility, recording to the information storage device any of: (i) information indicative of a batch-specific material property, (ii) information indicative of a vessel-specific material property, and (iii) an identifier of a record of batch-specific or vessel-specific material property information.

In a fourth separate aspect, the present invention relates to a method employing a plurality of wireless information reading devices for managing a plurality of material storage vessels having associated electronic information, the method including the steps of: detecting the entrance of a first material storage vessel in a material ingress functional area of a material end use process facility; automatically transferring to a data repository information associated with the first material storage vessel and indicative of any of a batch-specific material property, a vessel-specific material property, a process tool operating instruction, and a material-specific utilization parameter; monitoring any of location and movement of the first material storage vessel among a plurality of functional areas in the material end use process facility; and automatically transferring to the data repository information indicative of any of vessel location and vessel movement.

In a fifth separate aspect, the present invention relates to a method including the steps of: [I] receiving, from an information storage device associated with a material-containing material storage vessel to a control device associated with a process tool, information indicative of any of: (a) identity of said material, (b) composition of said material, (c) source of said material, (d) quantity of said material, (e) batch of said material, (f) a batch-specific property of said material, (g) a vessel-specific property of said material, and (h) vessel identity; [II] fabricating or processing a product with a process tool employing material received from the material storage vessel; and [III] associatively storing the received information with product information indicative of any of (i) product identification, (ii) product batch identification, and (iii) date or time of said product fabrication or processing.

Another separate aspect of the invention relates to systems, including automated systems, for implementing the foregoing methods. In another separate aspect of the invention, any of the foregoing aspects may be combined for additional advantage.

These and other aspects and advantages of the present invention will be apparent upon review of the ensuing disclosure and appended claims.

BRIEF DESCRIPTION OF THE DRAWINGS

For a more complete understanding of the present invention in the advantages thereof, reference is now made to the following description taken in conjunction with the accompanying drawings wherein:

FIG. 1 is a perspective assembly view of material storage vessel having an electronic information storage element disposed in a cap thereof, the vessel having an associated probe connector with a connector head and a probe extending therefrom.

FIG. 2A is a perspective assembly view of a cap for material storage vessel, the cap having a mechanically keyed upper edge, with an electronic information storage element FIG. 2A is a perspective assembly view of a key ring portion of a cap for a fluid storage and dispensing vessel, the key ring portion adapted to receive an electronic information storage element (e.g., a RFID tag) and having a mechanically keyed probe connector interface.

FIG. 2B is an elevation and partial cut-away assembly view of the key ring portion of FIG. 2A and electronic information storage element with associated retention components.

FIG. 3 is a schematic view of a filling system for a material storage vessel having at least one associated electronic information storage element.

FIG. 4 is a schematic view of material storage vessel monitoring system.

FIG. 7 is a logic diagram depicting various steps of second material storage vessel management method.

FIG. 8 is a logic diagram depicting various steps of third material storage vessel management method.

DETAILED DESCRIPTION

Figure 5:
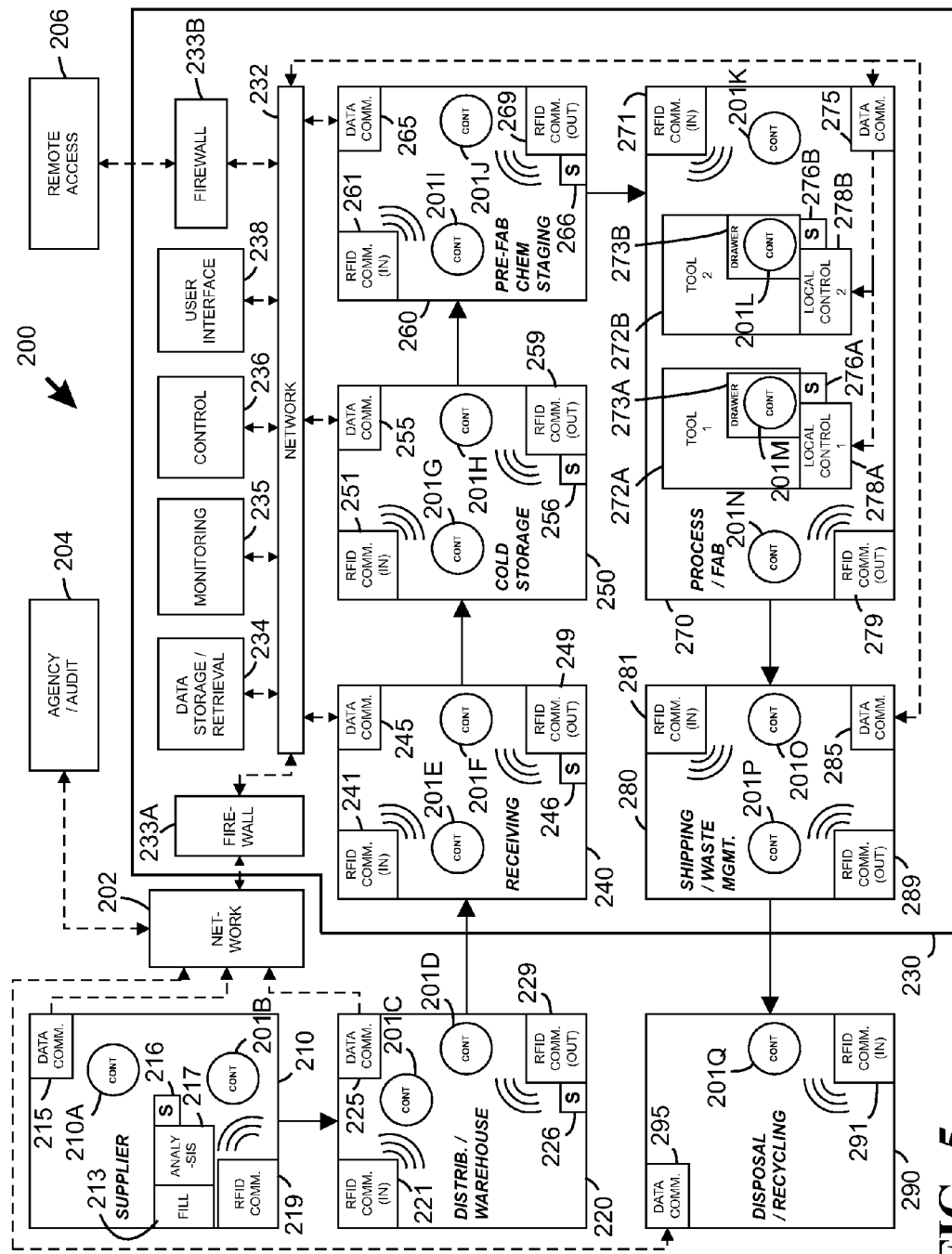
FIG. 5 is a schematic view of a material management system showing the direction of material transit along with and the interconnection of various elements within a material end use process facility and among external facilities.

The disclosures of the following United States Patents and patent applications provide context for the present invention, are hereby incorporated by reference herein in their respective entireties: U.S. patent application Ser. No. 10/742,125 filed Jul. 13, 2005 (and published as U.S. Patent Application Publication No. 2004/0172160 on Sep. 2, 2004) in the names of Kevin T. O'Dougherty, Robert E. Andrews, Tripunithura V. Jayaraman, Joseph P. Menning, and Chris A. Baye-Wallace for "SECURE READER SYSTEM;" U.S. patent application Ser. No. 10/139,104 filed May 3, 2002 in the names of Kevin O'Dougherty and Robert E. Andrews "LIQUID HANDLING SYSTEM WITH ELECTRONIC INFORMATION STORAGE;" U.S. Patent Application No. 60/710,216 filed Aug. 22, 2005 in the names of James V. McManus, Jerrold D. Sameth, and Frank DiMeo, Jr., for "MATERIAL CONTAINMENT SYSTEM;" U.S. Patent Application No. 60/687,896 filed Jun. 6, 2005 in the names of ""John Kingery, Dennis Brestovansky, Kevin O'Dougherty, Glenn M. Tom, Kirk Mikkelsen, Matthew Smith, Don Ware, Greg Nelson, Bob Haapala, Russ Oberg, Tim Hoyt, Jason Gerold, Kevin Nesdahl, and John Jancsek for "MATERIAL STORAGE AND DISPENSING SYSTEMS AND PROCESSES," and U.S. Pat. No. 6,494,343 issued Dec. 17, 2002 in the names of James V. McManus, Michael Wodjenski, and Edward E. Jones for "MATERIAL STORAGE AND DISPENSING SYSTEM FEATURING EX-SITU STRAIN GAUGE PRESSURE MONITORING ASSEMBLY."

The present invention relates to systems and methods employing information storage (preferably electronic information storage) elements associated with material storage and dispensing vessels, wherein stored information is manipulated and used in order to manage and promote efficient utilization of material storage vessels and their contents.

The term "material" in the context of material storage and dispensing vessels and their contents refers broadly to any solid (e.g., in powdered or granular form), liquid, gas, plasma, solution, mixture, slurry, or suspension, and may refer to any material that is critical to a manufacturing or experimental process, including, but not limited to, precursors and consumables for use in the semiconductor, medical, pharmaceutical, biological, nuclear, and nanotechnology fields.

The term "fluid" as used herein refers to any of a liquid, gas, plasma, solution, mixture, slurry, and a suspension. Thus, a "fluid" may include significant solid content, and solids may be further provided within a material storage vessel to serve as adsorption media. In a preferred embodiment, a material storage vessel contains a substantially pure fluid.

Vessels contemplated by the invention include a wide variety of material storage and dispensing apparatuses. Except as limited or otherwise provided herein, in general vessels described herein can be any suitable vessels for materials. Such vessels may comprise atmospheric vessels, superatmospheric vessels, or subatmospheric vessels such as those described in any of the following U.S. Pat. Nos. 5,518,528; 5,704,965; 5,704,967; 5,935,305; 6,406,519; 6,204,180; 5,837,027; 6,743,278; 6,089,027; 6,101,816; 6,343476; 6,660,063; 6,592,653; 6,132,492; 5,851,270; 5,916,245; 5,761,910; 6,083,298; 6,592,653; and 5,707,424; all of which are hereby incorporated herein by reference, in the respective entireties.

Material storage vessels as described herein further include vessels containing physical adsorption media for sorptively retaining a gas, and for storage and subsequent dispensing of gas under desorption and dispensing conditions. In this respect, a sorbent medium may include a solid, solvent, liquid, semi-solid, or other material having capability as a storage medium. For example, a material storage medium and may include a reversible reactive liquid medium, e.g., an ionic liquid medium, capable of reactive uptake of fluid in a first step, and reactive release of previously taken up fluid in a second step, wherein the first and second steps are at reverse reactions in relation to one another, to define a reversible reaction scheme. In another embodiment, a vessel uses a liquid absorbent, such as disclosed in a U.S. Patent Application Publication number 2004/0206241, which is hereby incorporated by reference.

Material storage vessels as described herein further include vessels having removable liners, such that the outer vessel serves as a selectively pressurizable overpack to facilitate controlled storage and controllable dispensing of the contents. Such vessels are as disclosed in U.S. Pat. No. 6,698,619 issued Mar. 2, 2004 in the name of Richard Wertenberger, the disclosure of which is hereby incorporated by reference.

One example of a material storage and dispensing assembly is illustrated in FIG. 1. Broadly the assembly includes a material storage vessel 10, a cap 20, and a probe connector 40 having a dispense probe 43. The material storage vessel 10 includes an aperture-defining neck 11. The cap 20 may be affixed to the vessel 10 by conventional means such as threaded engagement, snap fitting, vacuum sealing, or solvent welding, and other conventional methods. As illustrated, the cap 20 includes an electronic information storage element 25. One example of such an element is an RFID tag (preferably comprising a writeable RFID tag) having a passive RF transponder, an antenna, and a programmable memory (e.g., an erasable programmable read-only memory (EEPROM), programmable read-only memory (PROM), flash memory, or non-volatile random access memory (RAM)) for storing any desirable information. Such memory is preferably dynamically updateable to permit information to be written thereto when deployed in use as applied to a material storage vessel. Magnetic storage elements may further be used. The stored information may, for example, be indicative of any of: a batch-specific and/or vessel-specific material property, a vessel-specific current and/or historical environmental condition, and material-specific utilization parameters such as settings or instructions for a process tool. More specific examples of information that may be saved in the memory include, but are not limited to, information indicative of material composition, material density, material viscosity, material pressure, material temperature, material volume, material mass, batch identification, manufacturer identification, fill date, material expiration date, a supplier-specific identifier, a customer-specific identifier, certificates of analysis (e.g., embodying batch-specific or vessel-specific material property information), an identifier of a certificate of analysis or similar record, and other similarly useful information.

Various types of electronic information storage elements 25 are contemplated, including short- and long-range RFID tags, EEPROMs, and similar storage devices. At least certain information may be stored in Electronic Product Code (EPC) data format. In one embodiment, a unique identifier is stored in an electronic information storage element associated with a particular vessel, with other vessel- or material-specific information stored remotely in a data repository (e.g., a dynamic database) that may be interrogated with the unique identifier to obtain desired information about the vessel. In a further embodiment, an electronic information storage element for a particular vessel includes a local memory of limited size and further includes a link (preferably a two-way link permitting both read/write capability relative to the electronic information storage device) to an external data repository having a much large memory for storing historical and other information relating to the vessel and/or its material contents. An electronic information storage element may include one or more stored identifiers enabling access to corresponding records stored in the data repository, such as records of batch-specific or vessel-specific material property information embodied in certificates of analysis. Multiple electronic information storage elements 25 of various types may be combined as desirable or useful for a particular end use application.

An electronic information storage element 25 may further include a processor, which may be a general-and purpose or application-specific integrated circuit, preferably including an associated A/D converter to receive input signals such as from sensors. The process is preferably adapted to perform arithmetic and other conventional processing operations.

In one embodiment, non-electronic information storage elements, such as conventional bar codes, may be associated with material storage vessels. In another embodiment, electronic- and non-electronic information storage may be used in combination. For example, certain information may be stored in read-only format in a non-electronic medium and associated with a material storage vessel, and such vessel may further include at least one electronic information storage element, preferably providing both read and write capabilities, as a further information storage element. In one embodiment, a non-electronic information storage element contains information that is redundant of at least certain information stored in an electronic information storage element associated with the same vessel, with the non-electronic information storage element serving as a secondary or backup data source, for example, to enhance reliability in case the electronic information storage element should malfunction or otherwise be compromised.

As illustrated, the vessel 10 and cap 20 are adapted to mate with a probe connector 40 having a dispense probe 43 to form a storage and dispensing assembly 15. The cap 20 includes a probe aperture 22 for receiving a dispensing probe 43, in addition to the electronic information storage element 25 mentioned previously. The connector 40 includes an antenna 45 (e.g., a radio frequency (RF) antenna), modular antenna line 48, adaptor tube 46, and probe 43. In a preferred embodiment, the cap 20 is threadably connected to the neck of the vessel 10. After the vessel 10 and cap 20 are transported to the desired location, the membrane 23 is exposed. The connector 40 is configured to be interconnected with the cap 20.

To assemble the assembly 15, the probe connector 40 is interconnected with the cap 20 that is joined to the vessel 10. The probe tip 42 is inserted through the scored rupturable membrane 23 and through the probe aperture 22 to protrude into the interior volume of the vessel 10. Continued pressure on the connector 40 then allows the connector 40 to be moved immediately adjacent to the cap 20. The probe 43 is then in communication with the interior of the vessel 10. As such, the connector 40 is mounted on the vessel 10. The adapter tube 46 provides a liquid passage from the interior of the vessel 10 to an external pump (not shown). In this manner, material can be extracted from the vessel 10 via the probe 43, adapter tube 46, and pump to be supplied to a manufacturing process tool, such as a semiconductor wafer processing tool. A typical material processing system may include a plurality of vessels 10 and appurtenant components, although only a single vessel 10 is illustrated for clarity.

Dispensation of material from the vessel 10 is preferably initiated, controlled, or otherwise regulated via an external controller (not shown) utilizing information retrieved from a first electronic information storage device 25. For example, a control unit may compare information received from the first electronic information storage device 25 to information about a process to be performed (e.g., identity and quantity of material required), and initiate material transfer accordingly. If the vessel 10 contains an undesired or unexpected material, then material transfer may be prevented. In this regard, such electronic information storage device 25 may be used for information-based misconnect prevention and/or to inhibit further transfer of a material that has expired or has been degraded (e.g., by environmental exposure). Conversely if the vessel 10 contains a material required by the process, then flow may be initiated, with the flow profile governable using information received from the first electronic information storage device 25.

As illustrated, the close proximity between the cap 20 and the connector 40 is compatible with a short signal reception range and weak signals strength for the first electronic information storage device 25. This may be desirable to provide positive package-to-connector/probe signal correlation and event management, for example in applications involving the placement of many vessels 10 disposed adjacent to one another so as to prevent crosstalk. Electronic information storage devices with greater signal reception range may be provided to supplement or supplant such a short-range device. Long-range electronic information storage devices can simplify general package management by permitting multiple vessels to be sensed with a smaller number of, and/or more spatially separated, antenna or reading devices. In one embodiment, a material storage includes both a short-range and a long-range electronic information storage device, with the former (short-range) electronic information storage device being useful to prevent misconnect and provide positive vessel-to-tool correlation for dispensation service, and the latter (long-range) information storage device being useful for other vessel management tasks, including interfacing with external reading devices, storing and transferring sensor (e.g., environmental) data, storing and transferring certificate of analysis (material specific) data, and the like.

In one embodiment, the cap and connector include mechanical key code elements adapted for misconnect prevention, such as described in U.S. Pat. No. 6,015,068 entitled "Liquid chemical dispensing system with a key code ring for connecting the proper chemical to the proper attachment," which is hereby incorporated by reference. For example, the cap 20 may include a key code ring portion (e.g., including at least one protrusion, recess, notch, groove, or the like), and the connector 40 may include a key pattern (e.g., at least one protrusion, recess, notch, groove, or the like) configured to mate with the key code ring portion of the cap 20. Each different material subject to storage in a container may be assigned a cap 20 having a specific key code configuration, with different materials having incompatible key codes. When an attempt is made to couple a cap and a connector keyed for different materials, proper seating between components is prevented by incompatible key pattern; only a cap and connector keyed to correspond to one another may be properly connected. Such configuration acts to prevent misconnection between a container having a material incompatible with a particular process tool. While such mechanical keying is known, and misconnect prevention functionality may be facilitated by retrieval and manipulation of information from vessel-mounted information storage elements as provided herein, in certain contexts it may be desirable to provide both mechanical and electronic misconnect prevention utility, with the option to deploy such misconnect prevention technologies together or in the alternative.

Referring to FIGS. 2A-2B, a dual interlock design for a material storage and dispensing assembly provides two independent misconnection means—namely, both an electronic information storage element and a mechanically keyed probe interface—that may be employed separately or together depending on the preference of the end user. Description of FIGS. 2A-2B is to be understood as taken in conjunction with the assembly 15 described hereinabove in connection with FIG. 1, but with substitution of a portion of the cap 20 illustrated in FIG. 1 with the key ring portion 320A illustrated in FIGS. 2A-2B.

The key ring portion 320A is adapted to receive a RFID tag 325 in a recess 350 having a flared upper portion 350A. Specifically, an annular washer retainer 351 is inserted first into the recess 350, followed by an insulating washer 352, then followed by the RFID tag 325, and finally topped by an upper target cap 355. These components 351, 352, 325, 355 may be retained in the recess 350 by press-fit, by adhesive, or by any other appropriate means.

The key ring portion 320A further includes a mechanically keyed probe interface 360 (inclusive of recesses 360A-360D defined along the upper boundary). The mating probe connector 40 includes corresponding mating structure (not shown) adapted to mate with the mechanically keyed probe interface 360. For example, the interface 360 may include a probe interface recess (360A-360D) and/or a probe interface protrusion, and the cap interface structure may include a correspondingly sized, shaped, and positioned cap interface protrusion and/or cap interface recess such that the probe connector 40 and the key ring portion 320A of the cap 20 can only be coupled with one another if such components are appropriately keyed to one another.

In a preferred embodiment, the mechanically keyed probe interface 360 has a corresponding alphanumeric key code, and the cap 20 comprises a visual indicator 365 indicative of the alphanumeric key code. As illustrated in FIG. 2A, numerals "3-12" and "14-23" are provided on the key ring portion 320A as a visual indicator 365 of the key code. This visual indication permits a user to visually ascertain the key code, for example, by noting the position of any probe interface recess (360A-360D) and/or a probe interface protrusion relative to the visual indicator 365. In the example s illustrated in FIG. 2A, the key code is "4-10-16-22," which are the numbers corresponding most closely in position to the recesses 360A-360D along the periphery of the key ring portion 320A.

The presence of both the mechanically keyed probe interface 360 and the RFID tag 325 in a single fluid storage vessel enables redundant misconnection prevention—with one means being mechanical and the other being electronic as relating to the RFID tag. Both means may be employed by a particular end user, or another end user may utilize only one misconnection means. Such flexibility aids the manufacturer in reducing the number of parts to produce and stock, and aids the end user in providing alternative or conjunctive misconnection prevention means employable at the option of the end user. Such flexibility is particularly useful for transitioning an end user facility from one misconnection prevention system type to another, since one set of fluid storage vessels may be used interchangeably with both new and legacy fluid management devices. Furthermore, such misconnect prevention systems may be usefully deployed during a trial of a new system at a material end user facility.

Referring again to FIG. 1, electronic information storage elements may be affixed to or otherwise associated with material storage vessels in various ways and configurations. While the first, preferably short-range, electronic information storage element 25 has been described hereinabove, the vessel 10 further includes a second, preferably long-range, electronic information storage element 50 disposed along an outside surface thereof. The second electronic information storage element 50 may include an inlay RFID label. Such an electronic information storage element 50 may be integrally formed with a vessel body (e.g., by molding), affixed to the exterior of a vessel body, affixed to or formed with a cap of a vessel, or provided in any other convenient configuration. Long-range electronic information storage elements are preferably provided along an external surface to minimize signal attenuation through intervening materials (e.g., a container wall).

Various sensors and appurtenant components may be utilized in conjunction with material storage vessels having electronic information storage elements, whether such sensors are transported with (e.g., affixed to) vessels or employed in stationary fashion in an environment shared for a given period with such vessels. In a preferred embodiment, one or more sensors are integrated or otherwise communicatively coupled with an (e.g., second) electronic information storage element 50, and may be disposed along an external surface of a vessel 10. Signals generated by such sensors are preferably transmitted to an electronic information storage device (e.g., second electronic information storage device 50) associated with a material storage vessel, but may also be transmitted directly or relayed to an external signal receiving device. Sensors may be useful, for example, to sense environmental conditions experienced with a material storage vessel between a supplier facility and a material end use facility, or even within a material end use facility, to assess whether the particular material at issue has degraded prior to its planned use. If a material has violated some environmental limit, such as age, temperature, shock, or the like, fluid transfer to a process tool may be prevented, or of such violation is detected in use, then further material transfer may be halted.

Desirable sensor types include: temperature, pressure, strain (e.g., to generate a pressure-responsive signal), chemical (e.g., amine sensors, oxygen sensors, and other chemical sensors matched as appropriate to the material contents within a particular vessel to detect leakage), moisture, acceleration, and material level (e.g., by optical or acoustic means). As is the case with electronic information storage elements 25, 50, sensors may be unpowered, self-powered (e.g., with batteries, capacitors, photovoltaic cells, or other charge generation or storage elements), or remotely powered (e.g., by rectifying an incoming high-frequency RF signal to produce useable electric charge). Remotely powered devices may utilize ISO 14444 (-A, -B, or -C) or ISO 15693 communication. Various sensors may be integrated with one another and/or with electronic information storage element(s) as desired. Conventional-scale or MEMS sensors may be used.

Pressure sensors of various types may be used, although sensors not requiring direct contact with the material to be sensed are preferred. In one embodiment, strain-responsive sensor is disposed on the exterior surface of the vessel and adapted to generate a pressure-indicative signal correlative of pressure of material in the vessel as the vessel expands and contracts in response to changes in pressure differential across the vessel wall, such as described in U.S. Pat. No. 6,494,343. Pressure signals may be used to sense leaking or empty containers (e.g., characterized by declining or low pressure), or to sense dangerous overpressure conditions. Output signals from pressure sensors may be compared to preset or user-defined thresholds, with high- or low-pressure state signals preferably being stored in a memory of an electronic information storage element in one embodiment.

Temperature sensors of various types may be provided, to sense temperature of material within a vessel, of a surface of a vessel, or of an environment in which a vessel is located. Temperature sensors may be further used to compensate pressure-indicative signals for temperature. Examples of suitable temperature sensor types include thermocouples, thermistors, and resistance temperature devices. Temperature signals are useful in many scenarios. High temperatures can degrade sensitive materials such as photoresist, whereas certain materials that are subject to cold storage need to return to a precisely controlled higher temperature range before being dispensed to a process tool. Output signals from temperature sensors may be compared to preset or user-defined thresholds, with high- or low-temperature state signals preferably stored being stored in a memory of an electronic information storage element in one embodiment.

One or more acceleration-responsive sensors may be provided to measure shock or acceleration experienced by a material storage vessel. Monitoring shock or acceleration of a material storage vessel may be useful for a variety of reasons, such as to identify potentially damaging impact or shock to the vessel and/or to detect conditions likely to alter the state of a vessel's contents. For example, if a vessel contains a slurry, a suspension having entrained solids, or surfactant-containing materials, impact shock or other high acceleration events can lead to undesirable sloshing, separation, foaming, or cause other undesirably non-uniform conditions. Multiple sensors may be provided to measure shock or acceleration in complementary directions and/or to provide redundant shock or acceleration measurement in case a single shock or acceleration sensor should fail. One examples of an acceleration sensor includes model ADXL320 manufactured by Analog Devices, Inc (Norwood, Mass.) and designs disclosed in U.S. Patent Application Publication No. 2003/0153116 entitled "Encapsulation of MEMS devices using pillar-supported caps" (which is hereby incorporated by reference). Output signals from acceleration sensors may be compared to preset or user-defined thresholds, with high acceleration state signals preferably stored being stored in a memory of an electronic information storage element in one embodiment.

Various types of material (chemical) sensors may be provided, such as to identify the presence of one or more specific materials (e.g., in liquid or gaseous form) outside a vessel and communicate one or more output signals to an electronic information storage device and/or a remote monitor. Output signals from material sensors may be compared to a preset or user-defined threshold to initiate an alarm or a responsive action. Such comparison may be performed locally within an electronic information storage element having an integral processor, assuming the presence of an appropriate processor and the existence of a preset or user-defined threshold resident in memory (e.g., communicated from an external source and stored locally) of the electronic information storage element; or alternatively, such comparison may be performed externally by periodically or on demand communicating information indicative of sensor signals to a processor of an industrial controller or computer (e.g., the control element 236 illustrated in FIG. 5). Chemical detection utility may be useful, for example, to identify leaks emanating from a storage vessel or other source. Particular types of materials to be sensed include oxygen, amines, and other types of materials that may be present in a storage vessel. One example of a useful material sensor 172 includes the KAMINA gradient micro array chip developed at the Karlsruhe Research Center or Forschungszentrum Karlsruhe GmbH (Karlsruhe, Germany). Further examples of useful material sensors 172 include fluoro- and halogen-sensing sensors disclosed in U.S. Patent Application Publication No. 2004/0163444 entitled "Nickel-Coated Free-Standing Silicon Carbide Structure for Sensing Fluoro or Halogen Species in Semiconductor Processing Systems, and Processes of Making and Using Same," which is hereby incorporated by reference.

Various types of sensors may be provided to identify material level and/or verify material type within the vessel. For example, optical and/or acoustic transceivers or sensors may be used. Acoustic measurements may be better suited for liquid media than with gas. In one embodiment, a transmitter portion of an acoustic transceiver transmits an initial acoustic signal to the exterior wall of the vessel wall and a receiver portion thereof detects the dissipation of the transmitted signal. A portion of the acoustic energy is dissipated in the vessel and in the material contained therein, with the amount of acoustic energy dissipated in the material depending on the quantity and/or type of material present. Different material types may provide different acoustic dissipation characteristics, such as may be related to differences in material density. Empirical data of acoustic dissipation for various vessel types containing differing levels of materials and/or materials of varying types may be generated through laboratory testing and stored as a lookup table in a memory, such as the memory of an electronic information storage device. Thereafter, acoustic signals received by a transceiver may be communicated to a processor (e.g., within an electronic information storage device) and compared to stored dissipation signals to identify any of material level and material type present in the vessel. In another embodiment, acoustic signatures of the contents of a particular vessel may be generated at one or more times during the filling of a vessel with a specific material and stored in an electronic information storage device for correlation to that specific vessel and material.

In one embodiment, sensors are preferably in at least intermittent communication with an electronic information storage device associated with a material storage vessel, or with another data repository such as may be remotely located. Such communication may occur at different frequencies or sampling rates as appropriate for the sensed parameter, available power, or any other considerations. Signal sampling rate may be dynamically varied in response to triggers or threshold events. For example, if pressure or strain is initially sampled at a rate of twice per hour, a reading substantially higher or lower than a cumulative average reading or other threshold value may trigger more frequent signal sampling or data transfer to a memory of an electronic information storage device or data repository.

FIG. 3 depicts a filling system 100 for material storage vessels such as the vessel 10. Such a system 100 may be used by a material supplier. The vessel 10 may include a first electronic information storage element 25, and a second electronic information storage element 50, preferably including any one or more sensors as described hereinabove. Material is supplied to the vessel 10 via a material supply station 102. During or after the filling step, a programming interface 104 (e.g., RFID-based) may be used to write information to an electronic information storage element 25 and/or 50. Such information may be limited to a unique identifier, such as coded in Electronic Product Code format, or may include any of the various types of information described hereinabove, such as material type, material level, material batch identity, batch-specific or container-specific material properties, material-specific utilization parameters for process tools, process tool operating instructions, and so on. The material supply station 102 and programming interface 104 are preferably controlled by a common controller 106, which preferably has access to information storage and may be networked with any of various conventional storage and communication devices.

FIG. 4 depicts a material storage vessel monitoring system 120 for monitoring one or more vessels 10A-10C. Each vessel may include a first electronic information storage element 25A-25C and a second electronic information storage element and/or sensors 50A-50C. The vessels 10A-10C are disposed within a common room, cabinet, or other enclosure 123. Ambient sensors 115 may be provided to monitor conditions within the enclosure 123. At least one electronic information reading and/or writing device 122 such as an RFID read/write device disposed in signal transmission and receiving range of the vessels 10A-10C disposed within the enclosure 123. A secondary antenna 121 may be further disposed in signal transmission and/or receiving range of the vessels 10A-10C. In one embodiment, a secondary antenna is provided on one or more vessel(s) 10A-10C to permit "daisy-chain" or similar communication between vessels to extend signal transmission/reception range relative to a reading device 122. The secondary antenna 121 may be used, for example, to extend the range of the electronic information reading device 122 and/or to transmit a high frequency RF signal useful to power the electronic information storage element(s) and/or sensor(s) 25A-25C 50A-50C. The electronic information reading device 122, which may be positionally fixed or handheld, is preferably in communication with a communication network 125 that may include access to the Internet. A data storage/retrieval element or data repository 126 may be connected to the reading device 122 via the network, and a monitoring terminal 128 can permit remote access to information obtained from the material storage vessels 10A-10C. Multiple enclosures 123, reading devices 122, and secondary antennae 121 may be provided in an expanded monitoring system. Such monitoring systems 120 may be installed, for example, at a material supplier facility (e.g., to track vessels 10A-10C following programming in the filling system 100), in a transit container adapted to contain multiple vessels 10A-10C, in a material process end use process facility, and/or a post-processing (e.g., recycling or waste processing) facility. Such persistent tracking is readily facilitated in part through the use of long-range communication and electronic information storage elements, such as long-range RFID tags, associated with material storage vessels.

FIG. 5 depicts a material management system 200 showing the interconnection of various elements within a material process end use (production) facility 230 and among external facilities 210, 220, 290, and showing the direction of material transit within the system 200. The system 200 includes multiple material storage vessels 201A-201Q, with each vessel 201A-201Q having at least one associated electronic information storage element (e.g., a cap-mounted short range RFID tag and a vessel wall-mounted long-range RFID inlay label), with said at least one electronic information storage element preferably being dynamically updateable to periodically receive and store information. Within the production facility 230, a network 232 and multiple data communication elements 245, 255, 265, 275, 285 permit communication with one another and to various network devices such as a central controller 236, a monitoring element 235, data storage/retrieval element 234, an optional remote access device 206, and a user interface 238, each employing hardware and software. Additional software platforms and/or modules (e.g., business process automation software, manufacturing execution systems, enterprise resource planning systems, and the like) may be employed as convenient or desirable to accomplish any of various material management, process management, process optimization, reporting, and monitoring functions. One or more firewalls 233A, 233B may be further provided to permit secure external communication.

Starting at upper left in FIG. 5, material is supplied to vessels (e.g., vessels 201A, 201B) via a filling station 213 disposed in the supplier facility 210. One or more sensor elements 216 are provided in the supplier facility 216 to sense environmental conditions. An analysis element or station 217 adapted to analyze the material and generate any of batch-specific and vessel-specific material property information is further provided. Such information may include, for example, parameters such as material identity, material density, material viscosity, and molecular weight. To minimize waiting for generation of analytical results prior to vessel shipment, analyses of material samples from batches or individual vessels may be performed after vessels have left the supplier facility 210, with the results later being transmitted (e.g. while in transmit or within the material end use facility 230) via the network 202, such as to record such information in a vessel-associated electronic information storage device following shipment. An electronic information (e.g., RFID) communication station 219 adapted to write information to the electronic information storage element of each vessel 201A, 201B is preferably in communication with each of the fill station 213, analysis element 217, and sensor element 216. Although the term "station" is used herein, any electronic information communication station may be portable and/or handheld where appropriate. In this manner, information from any of the filling station 213, analysis element 217, and sensor element 216 may be communicated to and stored in the vessel electronic information storage element along with a date and/or time stamp as a vessel (e.g. vessel 201B) exits the supplier facility 210. Since analytical results may take significant time to obtain, to prevent undue transit delays, material storage vessels may be shipped out of the supplier facility without analytical information, but bearing sufficient information stored in associated electronic information storage elements to permit analytical results to be transmitted to and received by such vessels when present at the distribution facility 220 or end use (production) facility 230. A data communication station 215 is preferably provided in the supplier facility 213 to permit such data transfer to and/or from the supplier facility 210. Communication with and reporting to an outside agency or auditor 204 may also be facilitated by the data communication station 215 via the network 202. In one preferred application, the end user (e.g., production process) facility 230 establishes communication with the supplier facility 210 via one or more networks (e.g., network 202) to obtain and/or verify information relating to a particular material storage vessel received by the end use facility 230.

From the supplier facility 210, material storage vessels (e.g., vessels 201C, 201D) may be transported to a distribution or warehouse facility 220. A first electronic information communication station 221 communicates with each incoming vessel (e.g., vessels 201C, 201D) to retrieve information from the vessel and/or write information to the vessel as it enters the distribution facility 220. Such communication capability is useful, for example, to automatically log the movement of vessels into the distribution facility 220 with electronic time and/or date stamps. By writing information to the electronic information storage element associated with a vessel, the vessel retains its own shipment record. A sensor element 226 is provided in the distribution facility 220 to sense an environmental condition therein, and a second electronic information communication station 229 is preferably provided to permit communication with each outgoing vessel at it leaves the distribution facility 220. If appropriate and desired, the first and second electronic information communication stations 221, 229 may be integrated into a single station. A data communication station 225 is further provided to communicate information between the receiving (or material ingress) area 240 and a data storage/retrieval device 234 (e.g., maintaining one or more dynamically updateable databases) via a communication network 232. Various hardware devices within the system are understood to operate with suitable machine-readable software.

From the distribution facility 220, material storage vessels are transported to the material end use facility 230, and are typically received in a receiving area 240. The receiving area 240 preferably includes first and second electronic information communication stations 241, 240 adapted to communicate with the electronic information storage element associated with each material storage vessel (e.g. vessels 201E, 201F), an environmental sensor element 246, and preferably with a data communication element 245. Vessel ingress and egress electronic time stamping is preferably performed with the first and second electronic information communication stations 241, 240 by saving such information to the electronic information storage element associated with a vessel, and optionally saving substantially the same information to a data storage/retrieval device 234 in communication with the receiving area 240 by way of a data communication element 245 and a communication network 232 (preferably internal to the end user facility 230). Communications between the receiving area 240 and the supplier facility 210 may be provided through the (internal) network 232, firewalls 233A or 233B, and an external network 202, such as to permit material analysis data and/or certification records to be communicated from the supplier to be saved to the electronic information storage element of the appropriate material storage vessel, and for such information to be simultaneously saved to the data storage/retrieval element 234. Any of various data validation checks may be performed on a material storage vessel received into the receiving area 240, or for that matter on a material storage vessel transported to any area within the end user facility 230. Data from each vessel electronic information storage element is automatically communicated via the data communication element 245 and network 232 to a data storage/retrieval element 234. Information indicative of the present and/or historical (e.g., spanning the duration of the presence of a vessel in the receiving area 240) environmental conditions in the cold storage area may be written to the electronic information storage element of each vessel either on a substantially continuous basis, or as the vessel exits the receiving area 240.

Various user-defined rules for acceptance and movement of materials may be applied to the vessels and materials disposed therein, typically relating to certificate of analysis results (e.g., including batch- or container-specific material property information) to be transmitted from an analytical services provided to the end user facility. A certificate of analysis, a unique identifier permitting access to a certificate of analysis, results of an acceptance or acceptability determination, and the like may be communicated and stored to the information storage element associated with a material-containing vessel, just as information stored in a vessel-associated information storage element may be communicated to a process tool control element, preferably upon entry of a vessel to a material end use facility. Furthermore, information indicative of a chemical usage template or other process tool operational instruction may be stored to, or enabled to be accessed from, an information storage device upon attainment of a specific event, such as acceptance of the vessel or material by an operator of a material end use facility. Automation of the preceding information transfer steps is desirable to eliminate delay in vessel transfer, as the materials contained in such vessels may be quite sensitive to environmental factors such as temperature, pressure, shock, radiation exposure, and so on.

From the receiving area 240, material storage vessels may be transported to a cold storage area 250. Such cold storage is beneficially employed for materials such as photoresist to prevent material degradation and extend shelf life. The cold storage area 250 preferably includes first and second electronic information communication stations 251, 250 adapted to communicate with the electronic information storage element associated with each material storage vessel (e.g. vessels 201G, 201H), an environmental sensor element 256, and a data communication station 255. Information indicative of the present and/or historical (e.g., spanning the duration of the presence of a vessel in the cold storage area 250) environmental conditions in the receiving area may be written to the electronic information storage element of each vessel either on a substantially continuous basis, or as the vessel exits the cold storage area 250.

From the cold storage area 250, material storage vessels may be transported to a thaw or pre-fabrication material (chemical) staging area 260. The staging area 260 preferably includes first and second electronic information communication stations 261, 260 adapted to communicate with the electronic information storage element associated with each material storage vessel (e.g. vessels 201I, 201J), an environmental sensor element 266, and a data communication station 265. Information indicative of the present and/or historical (e.g., spanning the duration of the presence of a vessel in the staging area 260) environmental conditions in the receiving area may be written to at least one electronic information storage element (e.g., a long-range RFID inlay label) of each vessel either on a substantially continuous basis, or as the vessel exits the staging area 260. If not previously stored in an electronic information storage element associated with a material storage vessel (e.g., upon filling at the supplier facility 210 or at any other point in the chain of supply of the vessel), process tool operating parameters, settings, or operating instructions, or other information affecting process tool material utilization, may be stored to a electronic information storage element of a material storage vessel in the staging area 260.

From the staging area 260, material storage vessels may be transported to a production process or fabrication area 270. The fabrication area 270 preferably includes first and second electronic information communication stations 271, 279 adapted to communicate with the electronic information storage element associated with each material storage vessel (e.g. vessels 201K, 201N) upon vessel ingress to and egress from the fabrication area 270. The fabrication area 270 further includes at least one process tool 272A, 272B. Examples of such tools include coater track process tools for applying photoresist and other semiconductor wafer fabrication process tools; however, other process tools appropriate to the medical, pharmaceutical, biological, nuclear, and/or nanotechnology may be employed. Each process tool 272A, 272B has an associated material (e.g., chemical) enclosure or drawer 273A, 273B for housing material storage vessels (e.g., vessels 201L, 201M) coupled in dispensing relationship to the process tool 272A, 272B. Each drawer 273A, 273B preferably contains multiple material storage vessels to permit significant periods of uninterrupted operation of the process tools 272A, 272B, and an electronic information storage element (e.g., a short-range RFID tag) of each material storage vessel is preferably in sensory communication with an associated local control element 278A, 278B via appropriate communication hardware. Such communication hardware may include a RFID reader (or read/write device) affixed to a probe connector adapted to mate in close proximity to a short-range RFID tag mounted in the cap of a vessel (e.g., as illustrated in FIGS. 2A-2B). A probe connector of such type may be in wired communication with a control element (e.g., an industrial controller or computer) operatively coupled to a process tool.

A local control element 276A, 276B may be provided for each process tool 272A, 272B, with each local control element 276A, 276B preferably being in communication with a central controller 236, a monitoring element 235, data storage/retrieval element 234, an optional remote access device 206, and a user interface 238, all via a data communication station 275 and a communication network 232 that is preferably local to the end user facility 230. Each process tool control element 272A, 272B is preferably adapted to access and/or modify any of the stored batch-specific and/or vessel-specific material property, vessel-specific current and/or historical environmental condition, and material-specific utilization parameters as input variables to examine the effect of said variables on any of process performance, tool performance, product performance, and product yield. Each process tool 272A, 272B further includes a sensor element 276A, 276B (e.g., a temperature sensor element) to monitor an environmental condition experienced by a material storage vessel, with such condition being reportable to the local and/or central control element(s) 276A, 276B, 232, and preferably being saved to the electronic information storage element of the material vessel. As material storage vessels (e.g., vessels 201L, 201M) are depleted, other vessels (e.g., vessel 201K) are supplied to the drawers 273A, 273B to resume operation of the process tools 272A, 272B.

Mass, level, or volume sensing of material contained within material storage vessels is desirably performed at any point in which material may be consumed or discharged, to provide indication of remaining material, and/or material consumption is tracked. Such information is desirably communicated, along with vessel position and material condition (e.g., environmental condition, as useful for determining whether certain materials remain suitable for their intended use), via the network 232 to the controller 236 (or other desirable element) for tracking material inventory within the material end use facility 230. If inventory of any particular material becomes depleted below a predetermined or user-determined threshold, orders for additional materials may be generated automatically and sent to an external supplier 210 via network link 202. The integration of information including material acceptability, vessel position, material mass/volume/level, material consumption, and vessel/material environmental condition, along provides unprecedented efficiency in determining and predicting future material needs. Automated material ordering to satisfy such needs minimizes the possibility that an experimental or industrial process will be interrupted by lack of proper or acceptable materials.

Following depletion of material from a material storage vessel (e.g., such as vessel 201N) in the fabrication area 270, signals indicative of an empty or depleted condition are preferably recorded to the information storage element associated with each material storage vessel (e.g., to prevent subsequent misconnect of an empty vessel to a process tool), and depleted vessels (e.g., vessels 201O, 201P) are transported to a shipping or waste management (material egress) area 280. Depleted vessels may be returned to the supplier for refilling or recycling, or provided to a waste services provider for waste processing. The shipping/waste management area 280 preferably includes first and second electronic information communication stations 281, 180 adapted to communicate with the electronic information storage element associated with each material storage vessel (e.g. vessels 201O, 201P) and a data communication station 285. In this manner, vessel ingress to and egress from the shipping/waste management area can be automatically tracked, logged, and/or monitored. A data communication station 275 is preferably provided to permit communication between the shipping/waste management area and other devices connected to the internal network 232, and/or external facilities or entities such as disposal/recycling facility 290, the supplier facility 210, and a tracking agency or auditor 204.

From the shipping or waste management area 280, depleted vessels may be transported to a disposal or recycling facility 290 preferably having a electronic information communication station 291 and a data communication element 295 permitting communication with external facilities or entities. A material storage vessel (e.g., vessel 201Q) may be alternatively remanufactured or reconditioned where appropriate.

In view of the foregoing the system 200 permits highly automated "birth to death" tracking and management of material storage vessels and their contents, thus providing substantial benefits such as: elimination of wafer scrap, wafer rework, and process downtime caused by use of an incorrect or invalid material, and enhanced and new data analysis capabilities for tool and process performance, and for advanced process control and optimization, by automatically delivering material specific attribute data directly to the process tool point of use. Other features and benefits of the system 200 are benefits identified below.

Unique information about each material storage vessel and its contents may be automatically added to a dynamically updateable electronic information storage element at any of several points during the supply, use, and/or disposal chain, thus providing an accessible electronic record at each point of the chain without requiring the generation and processing of separate (e.g., paper) records. This significantly reduces manual labor and the possibility of error in material tracking and management.

Material storage vessels may be immediately shipped from a supplier facility 210 without waiting for analytical results of material contents, since such results can be transmitted to any of the distribution facility 220 and the end user facility 230 and then "merged" into the dynamically updateable electronic information storage element associated with the material storage vessel. This reduces material shipment delays and reduces the possibility of supply chain interruption.

The system 200 permits the end user to easily define, change, and apply rules for the acceptance, movement, and proper use of each material storage vessel and its contents.

The system 200 provides the end user the ability to provide material suppliers with detailed inventory reports of the location of every supplier vessel located within the end user facility 230. Automated inventory "picklists" allowing automatic communication of inventory resupply requirements to its upstream inventory stockpoint may be generated by the system 200.

The system 200 enables data transfer capability between the end user facility 230 and the material supplier. If desired, communication can be established between the material supplier and a data repository associatable with an electronic information storage element being associated with a particular material storage vessel. Such communication permits the exchange of any of vessel-specific, material-specific, and batch-specific information.

Information about any of material characteristics, vessel information, current and historical environment conditions, and material usage information is stored on an electronic information storage element associated with a material storage vessel, and is shared with external software and data systems. Such information, desirably including other process information, may be displayed to the user through various types of user interfaces, including a local display (e.g., a touch control display) disposed at or on process tool, a local remote display (e.g., user interface 238) removed from a process tool but within the process facility housing such process tool, or a truly remote display distant from the process tool. For example, for a process tool 272A comprising a Track Process Tool, such display may include a representation of which material is connected to a specific dispense nozzle, and provide detailed information is about each material. Such information about any of material characteristics, vessel information, current and historical environment conditions, and material usage may be used by the process tool 272A and/or any associated or integrated control element 278A, 236 or monitoring element 235 to permit flexible and comprehensive tool and production reporting.

In a preferred embodiment, data transfer between an electronic information storage device or element associated with a material storage vessel (e.g., vessel 201M) is provided to an external devices such as a process tool controller (e.g., control 278A) in a communication format such as Semiconductor Equipment Communication Standard ("SECS") or SECS-GEN. For example, as applied to a coater track process tool having multiple nozzles, an electronic information storage element associated with one material storage vessel may be assigned a data file that is uniquely mapped to a specific nozzle of the tool, along with other field identification as necessary or appropriate. Such file may include comma delimited data having multiple fields, such as provided in the following attribute listing and example data file:

| CoatModuleName,CoatModuleNumber,<br>ResistNozzleNumber,BottleNumber |
| --- |
| COT,10123,1,1 |
| COT,10124,1,1 |
| COT,10125,1,1 |
| COT,10126,1,1 |
| BCT,10123,2,1 |
| BCT,10124,2,1 |
| BCT,10125,2,1 |
| BCT,10126,2,1 |

Figure 6:
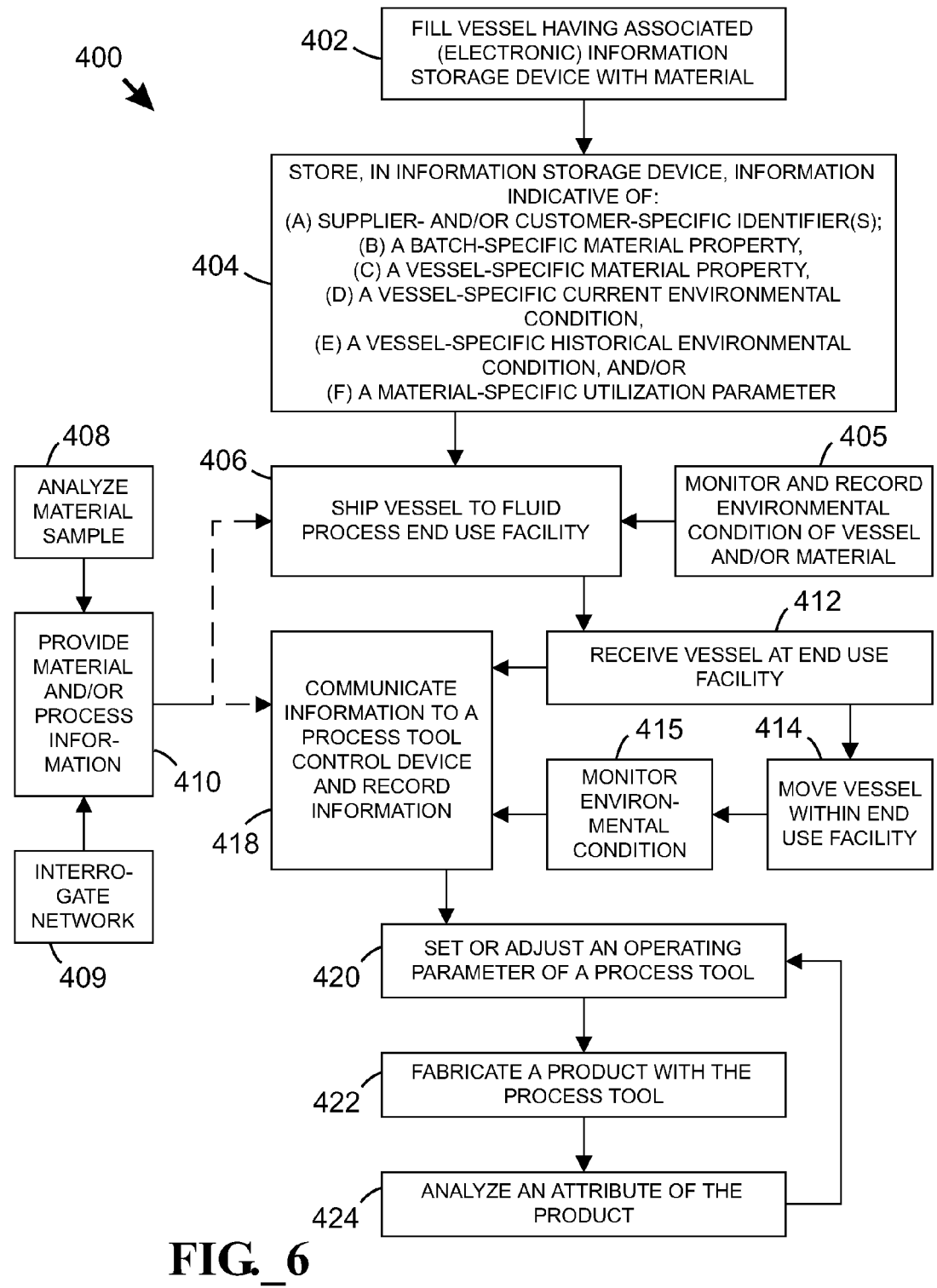
FIG. 6 is a logic diagram depicting various steps of first material storage vessel management method.

The system 200 enables a variety of material management methods. For example, referring to FIG. 5, a material management method 400 is directed generally to the storage of information in an electronic information storage device, and utilization of stored information to set or adjust an operating parameter of a process tool. Starting at the top of FIG. 6, a first method step 402 includes filling a vessel with material having an associated electronic information storage device. A second method step 404 includes storing, and an electronic information storage device associated with the vessel, information indicative of any of (a) a batch-specific material property, (b) a vessel-specific material property, (c) a vessel-specific current and environmental condition, (d) a vessel-specific historical and environmental condition, and (e) a material-specific utilization parameter (or process tool operating parameter). The steps 402, 404 may be performed with a filling system 100 as described hereinabove.

A material sample representative of the contents of a material storage vessel may be analyzed in a third step 408. Such analysis may be performed during or after a shipment of a material-containing storage vessel to a material process end use facility in step 406. During transit, an environmental condition of the vessel and/or material may be monitored by any of various sensors in step 405. Following material analysis, the analytical results may be made available to a material storage vessel in step 410. Additionally, or alternatively, process information such as material-specific utilization parameters or operating parameters other process tool may be made available to a material storage vessel in step 410. Such information may be provided automatically or in response to a network interrogation request in step 409. The information may be matched up with appropriate material storage vessels during a shipment step 406, upon receipt of a vessel at an end use facility in step 412, or as part of a separate communication step 418 wherein information from a material storage vessel and/or data repository is communicated to a process tool control device. If a material-containing vessel is moved within the end use facility in step 414, the environmental conditions experienced by the vessel may be monitored in step 415.

The communication of information from an electronic information storage device (associated with a material storage vessel) to a process tool control device in step 418 permits an operating parameter of a process tool to be set or adjusted automatically in step 420. Thereafter, a process is performed and/or a product article is fabricated with the process tool in step 422. Such a product article need not embody a finished consumer good; rather, it may include any suitable processed material, and embody a precursor material for a subsequent process step. Preferred product articles include semiconductor materials, such as a semiconductor substrate, wafer, or boule; alternatively, a product article may include a medical, pharmaceutical, biological, or nuclear article. Following the processing or fabrication step 422, an attribute of the product article is analyzed in step 424. Such analysis may include any of conventional various performance tests or quality assurance/quality control tests. Responsive to the analysis step 424, an operating parameter of the process tool may be further adjusted in step 420. The resulting method 400 is well-adapted for process optimization, and eliminates the need for manual input of material-specific process parameters with its attendant possibility for operator error.

Various steps of another material management method are depicted in FIG. 7. In a first method step 432, a material storage vessel is filled with material and information relating to the same (e.g., a unique vessel identifier, material quantity, material type, intended recipient identification, and so on) is stored in an associated information storage device. The material-containing vessel is shipped to an end use process facility in a subsequent step 436. During or after the transit step, a material sample representative of the contents of the material storage vessel is analyzed (e.g., at a material supplier facility or remote testing facility) in step 438 to ascertain any of various material properties. Shipment of the vessel in step 436 prior to completion of the analysis step 438 avoids shipment delay and maximizes material shelf life.

The information generated by the analysis step 438 may be made available to the appropriate material storage vessel in step 440. For example, analytical results may be transmitted to and matched up with the appropriate vessel during the shipment step 436. Alternatively, the analytical results may be matched up with the appropriate vessel upon receipt at an end use facility receiving area, or when a vessel is placed at an appropriate staging area within such end use facility. The analytical information may be stored in an electronic information storage device associated with the appropriate vessel or communicated to a networked data repository remote from the vessel (e.g., and correlated to the vessel via a unique identifier, e.g., as an Electronic Product Code) in step 444. In a further embodiment, both local and remote storage (relative to the vessel) of the material information is provided. With the benefit of such information, a qualification step may be performed in which comparison is made to predetermined or user-defined criteria for any of (a) end use process facility acceptance of a vessel; (b) movement of a vessel to a predetermined location (e.g. within the end use facility); and (c) selected use of the vessel and its material contents. The stored information is then communicated to a process to control device in step 448, and an operating parameter of the process tool is set or adjusted in step 450. Thereafter, a product may be fabricated and analyzed, with results used to further adjust an operating parameter for process optimization, as discussed previously.

Further information transfer and verification steps may be utilized with the foregoing methods. In one embodiment, a record including batch-specific or material-specific material property information (such as included in a certificate of analysis) is communicated via a network from an analytical services provider to a data repository accessible via a material end use facility, and an identifier enabling access to such record is communicated or otherwise stored to an electronic information storage element associated with a vessel containing such material. Such identifier may be used to access the stored record of material property information, and permit verification (e.g., by a control device associated with a process tool) of acceptability of such information prior to dispensation of material from the vessel to a process tool. In another embodiment, acceptability of material property information obtained from such an analysis is verified, and information indicative of such acceptability verification is recorded to the information storage device associated with a vessel containing the material.

Steps of yet another material management method 460 are depicted in FIG. 8. Starting at upper right, a first step 461 includes providing a material specification. A second step 460 include supplying led to a material storage vessel having an associated electronic information storage device. Within the electronic information storage device (or alternatively, in a remote data repository linked to an on-vessel identifier) information indicative of any of: (a) material identity; (b) material composition; (c) material source; (d) material quantity; (e) material batch; (f) a batch-specific material property; (g) any vessel-specific material property; and (h) vessel identity is stored in step 464. Information indicative of environmental condition experienced by the vessel and/or its material contents may be monitored in step 475, and such information stored (e.g., in an electronic information storage device or central data repository) in step 476. Any of the foregoing information is provided to a control device associated with a process tool in step 478, and used to set adjust a process parameter of the process tool in step 480. A product employing a material received from the material storage vessel is fabricated in step 482. Thereafter, information specific to the material and/or vessel, optionally including environmental condition information, is associatively stored (e.g., in a searchable database) with product information in indicative of any of (a) product unique identification; (b) product batch information; and/or (c) product fabrication date/time. Such storage correlates a fabricated product with materials used in its manufacture. One or more attributes of the product are analyzed in step 484, with the results being useful to responsively adjust a parameter of the process tool in step 480. Product analysis may be performed just after product production, or in some cases well afterward. The ability to correlate device performance to source materials facilitates process optimization and facilitates rapid recall of products or product batches later determined to be defective, all without requiring universal product assurance testing. Responsive to the product analysis step 484, material specifications 461 may also be adjusted as desirable to improve the production process.

Subsequent database searches of the linked finished product/material database may be performed in step 485 for any of various reasons, and reports generated in step 486. The automated accounting for material usage embodied in products substantially eliminates data input errors, permits rigorous analysis of the impact of material specifications and materials provided by individual suppliers on product yield, and streamlines reporting to recycling or disposal organizations, governmental bodies, and/or trade organizations.

While the invention has been described herein in reference to specific aspects, features, and illustrative embodiments of the invention, it will be appreciated that the utility of the invention is not thus limited, but rather extends to and encompasses numerous other variations, modifications, and alternative embodiments, as will suggest themselves to those of ordinary skill in the field of the present invention, based on the disclosure herein. Correspondingly, the invention as claimed hereinafter is intended to be broadly construed and interpreted as including all such variations, modifications, and alternative embodiments within its spirit and scope.

What is claimed is:

1. A method comprising:
communicating, from an information storage device attached to a material storage vessel adapted to contain a fluid, to a control device associated with a semiconductor manufacturing process tool, information indicative of any of: (A) a fluid-specific utilization parameter, and (B) a process tool operating instruction, wherein the communicated information is configured to be used in one of setting and adjusting an operating parameter of the process tool in managing how the fluid is used;
employing the communicated information to set or adjust the operating parameter of the process tool to manage how the fluid is used in a fabrication process;
fabricating or processing a product article utilizing the process tool;
analyzing an attribute of the product article; and
responsive to the analyzing step, adjusting the operating parameter of the process tool.

2. The method of claim 1, wherein the information storage device comprises an electronic information storage device.

3. The method of claim 2, wherein the electronic information storage device comprises a dynamically updateable memory, the method further including recording information to the memory following shipment of the material storage vessel to an end user process facility having therein a process tool adapted to receive the fluid from the material storage vessel.

4. The method of claim 1, further comprising:
performing an analysis of a sample of the fluid to obtain information indicative of a batch-specific or vessel-specific fluid property; and
recording any of (i) the batch-specific or vessel-specific fluid property information and (ii) an identifier of a record indicative of said batch-specific or vessel-specific fluid property information, to the information storage device.

5. The method of claim 1, wherein the process tool is adapted to utilize the fluid in forming the product article.

6. The method of claim 1, wherein the material storage vessel further comprises a physical adsorption medium for sorptively retaining the fluid for storage and subsequent dispensing of the fluid under desorption and dispensing conditions.

7. The method of claim 1, further comprising monitoring location of the material storage vessel among a plurality of functional areas in a fluid end use process facility.

8. A method comprising:
receiving, from an information storage device attached to a material storage vessel adapted to contain a fluid, information indicative of any of: (A) a fluid-specific utilization parameter, (B) a fluid property, and (C) a process tool operating instruction, wherein the received information is configured to be used in one of setting and adjusting an operating parameter of a semiconductor manufacturing process tool in managing how the fluid is used;
employing the received information to set or adjust the operating parameter of the process tool to manage how the fluid is used in a fabrication process;
processing or fabricating an article of manufacture utilizing the process tool to yield a processed or fabricated article;
analyzing an attribute of the processed or fabricated article; and
responsive to the analyzing step, adjusting the operating parameter of the process tool.

9. The method of claim 8, wherein the material storage vessel further comprises a physical adsorption medium for sorptively retaining the fluid for storage and subsequent dispensing of the fluid under desorption and dispensing conditions.

10. The method of claim 8, further comprising monitoring location of the material storage vessel among a plurality of functional areas in a fluid end use process facility.

11. A method employing a plurality of wireless information reading devices for managing a plurality of material storage vessels each having an attached information storage device comprising associated electronic information and adapted to contain a fluid, the method comprising the steps of:
detecting the entrance of a first material storage vessel in a fluid ingress functional area of a fluid end use process facility;
automatically transferring to a data repository the information associated with the first material storage vessel and indicative of any of a batch-specific fluid property, a vessel-specific fluid property, a vessel-specific current or historical environmental condition, a process tool operating instruction, and a fluid-specific utilization parameter, wherein the transferred information is configured to be used in one of setting and adjusting an operating parameter of a process tool in managing how the fluid is used;
fabricating or processing a product article utilizing the process tool;
analyzing an attribute of the product article; and
responsive to the analyzing step, adjusting the operating parameter of the process tool.

12. The method of claim 11, wherein the data repository comprises at least one information storage device associated with the first material storage vessel.

13. The method of claim 11, wherein the automatic transferring step comprises receiving an identifier from the first material storage vessel and interrogating a communication network with the identifier to obtain electronic information indicative of any of a batch-specific fluid property and a vessel-specific fluid property.

14. The method of claim 11, further comprising:
automatically transferring to a controller associated with a process tool the information indicative of any of the batch-specific fluid property, the vessel-specific fluid property, and the fluid-specific utilization parameter; and
employing the communicated information to adjust the operating parameter of the process tool.

15. The method of claim 11, wherein the material storage vessel further comprises a physical adsorption medium for sorptively retaining the fluid for storage and subsequent dispensing of the fluid under desorption and dispensing conditions.

16. The method of claim 11, further comprising monitoring location of the material storage vessel among a plurality of functional areas in a fluid end use process facility.

17. The method of claim 16, further comprising monitoring movement of the first material storage vessel among the plurality of functional areas in the fluid end use process facility indicated by a change in the location of the first material storage vessel among the plurality of functional areas in the fluid end use process facility.

18. The method of claim 17, further comprising automatically transferring to the data repository information indicative of any of the location of the first material storage vessel and the movement of the first material storage vessel.

19. A method comprising:
receiving, from an information storage device attached to a material storage vessel adapted to contain a fluid, to a control device associated with a process tool, information indicative of any of: (a) identity of said fluid, (b) composition of said fluid, (c) source of said fluid, (d) quantity of said fluid, (e) batch of said fluid, (f) a batch-specific property of said fluid, (g) a vessel-specific property of said fluid, (h) a vessel-specific current environmental condition, (i) a vessel-specific historical environmental condition, (j) a fluid-specific process tool utilization parameter, and (k) vessel identity,
wherein the received information is configured to be used in one of setting and adjusting an operating parameter of a process tool in managing how the fluid is used;
fabricating or processing a product with a process tool employing fluid received from the material storage vessel and using the received information to manage how the fluid is used in said product fabrication or processing, wherein the fabricated or processed product comprises any of a semiconductor substrate, a semiconductor wafer, a semiconductor boule, and a semiconductor precursor structure;
analyzing an attribute of the product; and responsive to the analyzing step, adjusting the operating parameter of the process tool; and associatively storing the received information with product information of the product fabricated or processed by the process tool indicative of any of (I) product identification, (II) product batch identification, and (III) at least one of date and time of said product fabrication or processing.

20. The method of claim 19, wherein the received information is indicative of any of a batch-specific property of said fluid and a vessel-specific property of said fluid.

21. The method of claim 19, further comprising employing the received information to set or adjust the operating parameter of the process tool.

22. The method of claim 19, wherein the information storage device comprises an electronic information storage device, the method further comprising:

monitoring at least one environmental condition experienced by any of the material storage vessel and fluid disposed within the vessel with one or more sensors associated with the material storage vessel; and storing information indicative of the at least one monitored environmental condition in the electronic information storage device.

23. The method of claim 19, wherein the material storage vessel further comprises a physical adsorption medium for sorptively retaining the fluid for storage and subsequent dispensing of the fluid under desorption and dispensing conditions.

24. The method of claim 19, further comprising monitoring location of the material storage vessel among a plurality of functional areas in a fluid end use process facility. dispensing of the fluid under desorption and dispensing conditions.

25. A material utilization system comprising: at least one material storage vessel adapted to contain a fluid and having an attached electronic information storage device having stored therein information indicative of any of: (A) a fluid-specific utilization parameter, (B) a process tool operating instruction, (C) a fluid property, and (D) a vessel-specific current or historical environmental condition, wherein the information is configured to be used in one of setting and adjusting an operating parameter of a process tool in managing how the fluid is used;

a semiconductor manufacturing process tool or semiconductor manufacturing process tool controller arranged to receive a signal representative of said information, and adapted to utilize said information to set or adjust the operating parameter of the process tool to manage how the fluid is used in a fabrication process;

a fabrication unit configured to conduct the fabrication process to fabricate or process a product article utilizing the process tool; and an analysis unit configured to analyze an attribute of the product article and responsively adjust the operating parameter of the process tool.

26. The material utilization system of claim 25, wherein the process tool controller or the process tool is adapted to prevent dispensation of the fluid from the at least one material storage vessel to the process tool if the fluid is incompatible with process tool requirements.

27. The material utilization system of claim 25, further comprising a monitoring unit configured to monitor the location of the material storage vessel among a plurality of functional areas in a fluid end use process facility.

* * * * *

UNITED STATES PATENT AND TRADEMARK OFFICE
CERTIFICATE OF CORRECTION

| | | |
|---|---|---|
| PATENT NO. | : 9,031,683 B2 | Page 1 of 1 |
| APPLICATION NO. | : 12/307957 | |
| DATED | : May 12, 2015 | |
| INVENTOR(S) | : Scott Elfstrom | |

It is certified that error appears in the above-identified patent and that said Letters Patent is hereby corrected as shown below:

In the Claims

Column 25, lines 30-33: "The method of claim 19, further comprising monitoring location of the material storage vessel among a plurality of functional areas in a fluid end use process facility dispensing of the fluid under desorption and dispensing conditions." should be -- The method of claim 19, further comprising monitoring location of the material storage vessel among a plurality of functional areas in a fluid end use process facility --.

Signed and Sealed this
Twenty-third Day of June, 2015

Michelle K. Lee
*Director of the United States Patent and Trademark Office*